United States Patent [19]

Naganoma et al.

[11] Patent Number: 4,478,274
[45] Date of Patent: Oct. 23, 1984

[54] SYSTEM FOR CONTROLLING A VEHICLE-MOUNTED AIR CONDITIONER

[75] Inventors: Masanori Naganoma, Kariya; Yoshiharu Kato, Toyohashi; Atsunori Saito; Yoshimichi Hara, both of Kariya; Katsuaki Matsushima, Toyota, all of Japan

[73] Assignees: Nippondenso Co., Ltd., Kariya; Toyota Jidosha Kogyo Kabushiki Kaisha, Toyota, both of

[21] Appl. No.: 312,323

[22] Filed: Oct. 16, 1981

[30] Foreign Application Priority Data

Oct. 17, 1980 [JP] Japan .................................. 55-145962

[51] Int. Cl.³ ............................................. F25B 29/00
[52] U.S. Cl. ........................................ 165/12; 62/180; 62/229; 62/243; 62/244; 165/14; 165/42
[58] Field of Search ................... 165/12, 14, 42, 25; 62/180, 229, 243, 244; 236/51

[56] References Cited

U.S. PATENT DOCUMENTS

| 4,265,395 | 5/1981 | Sumikawa et al. | 236/51 |
|---|---|---|---|
| 4,274,265 | 6/1981 | Okumura | 62/244 |
| 4,287,939 | 9/1981 | Pohl et al. | 236/51 |
| 4,289,195 | 9/1981 | Bellot et al. | 165/12 |
| 4,315,413 | 2/1982 | Baker | 62/180 |
| 4,316,251 | 2/1982 | Saito et al. | 165/42 |
| 4,320,628 | 3/1982 | Okajima | 62/244 |
| 4,325,426 | 4/1982 | Otsuka et al. | 165/12 |
| 4,337,821 | 7/1982 | Saito | 165/12 |
| 4,338,791 | 7/1982 | Stamp, Jr. et al. | 165/29 |
| 4,346,729 | 8/1982 | Franz | 165/42 |
| 4,358,050 | 11/1982 | Naganoma et al. | 165/42 |

FOREIGN PATENT DOCUMENTS

| 25592 | 3/1981 | European Pat. Off. | 165/42 |
|---|---|---|---|
| 2064825 | 6/1981 | United Kingdom | 62/244 |

Primary Examiner—Douglas Hart
Attorney, Agent, or Firm—Cushman, Darby & Cushman

[57] ABSTRACT

A control circuit for a vehicle-mounted air conditioner having plural dampers therein comprises a manual command entry unit for entering command signals to a computer unit. The computer unit includes a first computer constantly powered by a vehicle-mounted storage battery to receive a temperature resetting command signal from the entry unit and a second computer which is powered from the battery through an engine ignition key switch to receive control data from the first computer to control the air conditioner. A plurality of operating parameter sensors also supplies sensed operating parameters to the second computer to permit it to control one or more of the dampers to direct conditioned air to the vehicle compartment. A display unit receives data from the computer unit to provide visual display of the reference temperature and the operating conditions of the air conditioner.

23 Claims, 20 Drawing Figures

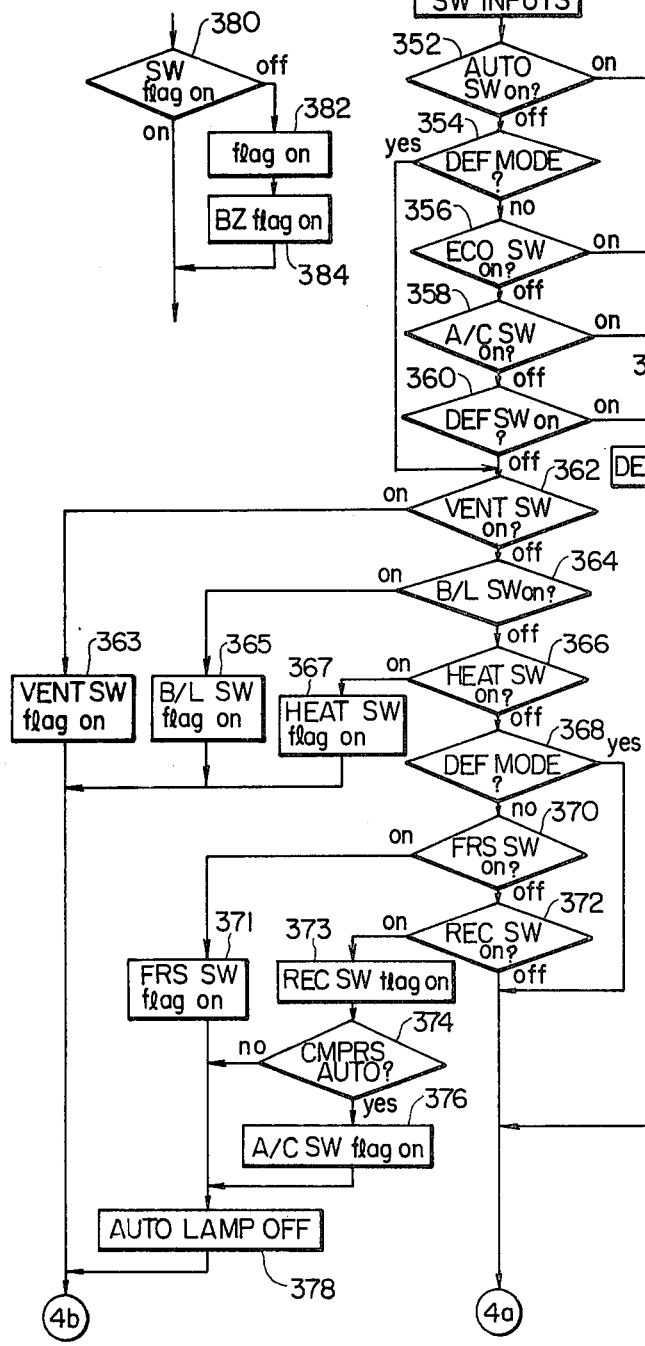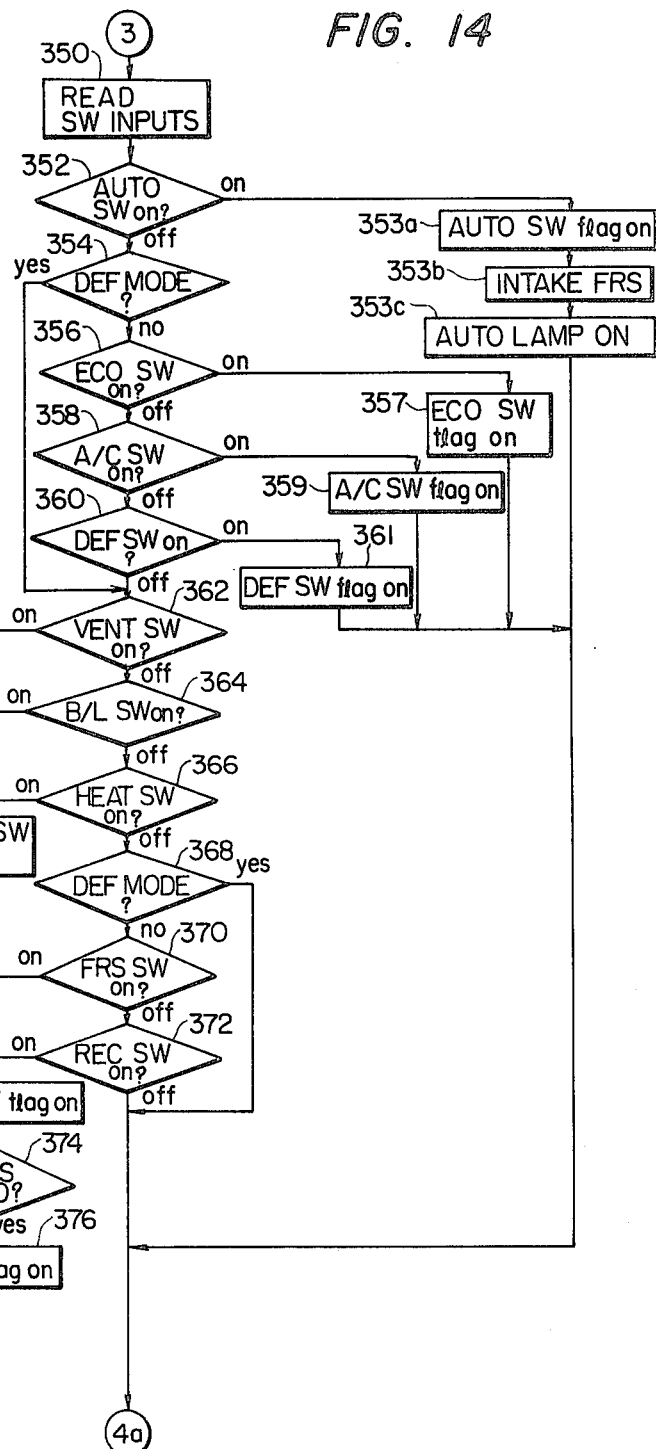
FIG. 15
FIG. 14

SYSTEM FOR CONTROLLING A VEHICLE-MOUNTED AIR CONDITIONER

BACKGROUND OF THE INVENTION

The present invention relates to a digital computer-based system for controlling an air conditioner mounted in a roadway vehicle.

Use of digital computers is desired for vehicle-mounted air conditioners to meet their diversified functions and high precision requirement. Large capacity memory is thus needed to meet these diversification and high-precision requirements. The memory capacity of currently available computers is not sufficient to meet these requirements. For vehicle-mounted air conditioners it is desirable that a given function be commonly used for various computer routines during periods of cruising, standstill and restarting.

SUMMARY OF THE INVENTION

An object of the present invention is therefore to provide a control system which overcomes the aforesaid problems.

According to the invention, the system for controlling an air conditioner mounted in a roadway vehicle comprises a first digital computer having a memory directly coupled to a storage battery mounted in the vehicle, and a second digital computer having an arithmetic/logic unit coupled to the storage battery via a key switch and receptive of data from the memory of the first digital computer for controlling the air conditioner. Because of the constant application of power to the first computer, important items of control data are not erased when the engine is turned off so that the first computer is readily available for delivery of control data to the second computer at the instant the engine is restarted.

Preferably the system includes input means for entry of manual command signals for resetting a reference temperature to a desired setting, display means for displaying visual indications including the reference temperature. The first computer is receptive of the command signals for generating display data representing the reference temperature for application to the display means and generating temperature control data. A plurality of sensors are provided for respectively detecting operating parameters of the air conditioner. The second digital computer receives the temperature control data from the first computer and the operating parameters detected by the sensors for controlling the air conditioner so that the temperature inside the vehicle varies in a direction toward the reference temperature.

BRIEF DESCRIPTION OF THE DRAWINGS

Various advantages and features of the invention will become apparent from the following detailed description which is given by way of example with reference to the accompanying drawings wherein:

FIG. 14 is a flow diagram of a mode selector switch read-in routine of the control program;

FIG. 15 is a flow diagram illustrating steps for checking various flags;

DETAILED DESCRIPTION

Figure 1:
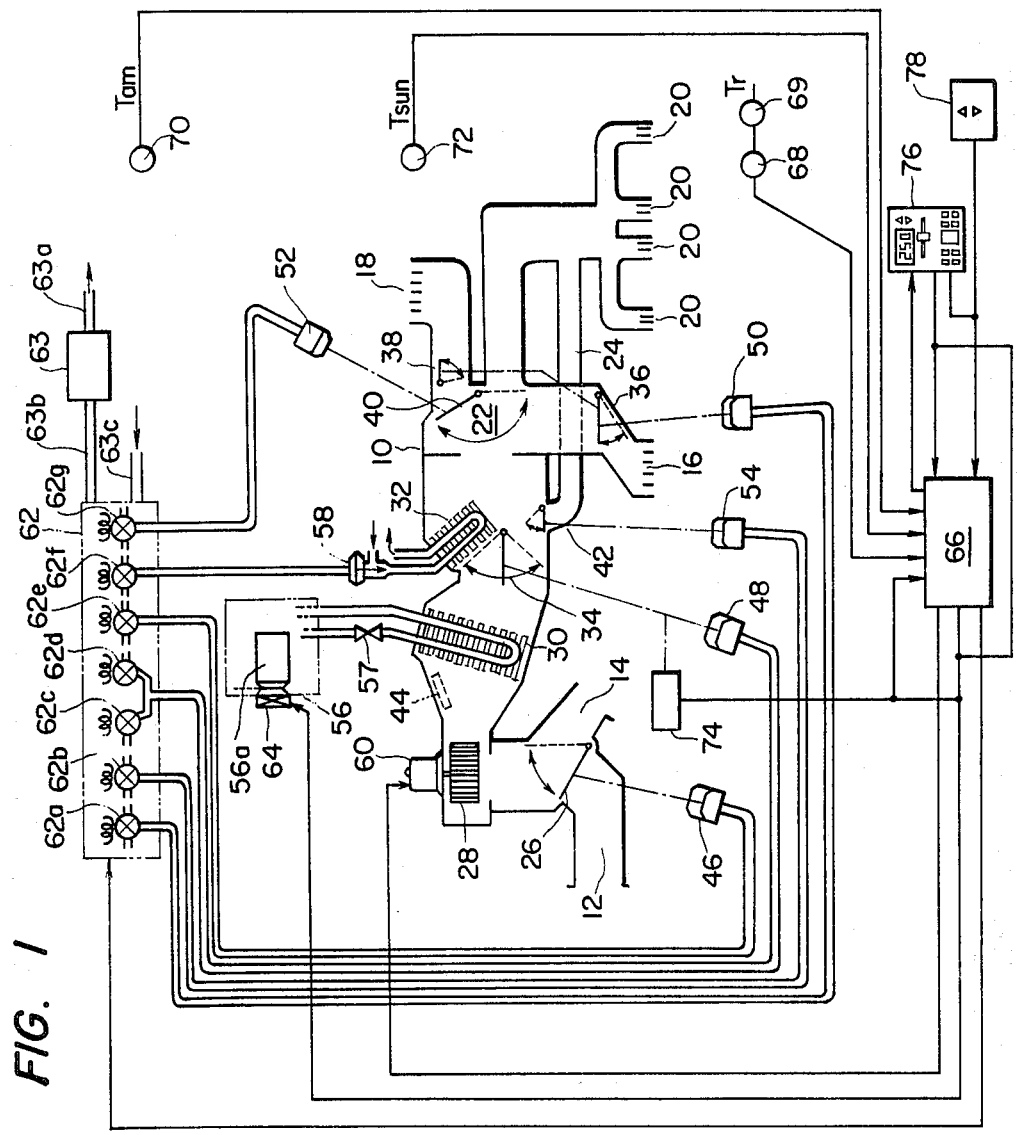
FIG. 1 is a block diagram of an embodiment of an air conditioner according to the present invention.

Referring now to FIG. 1, there is shown an embodiment of a vehicle-mounted air conditioner of the invention. Numeral 10 indicates an air conditioner main unit housed in a duct located in a forward end portion of the passenger compartment. The main unit 10 is provided with a fresh (outside) air intake nozzle 12 and a recirculating (inside) air intake nozzle 14 both being located in the upstream end thereof. At the downstream end of the unit are provided a heater exhaust nozzle 16 for directing warm air to a leg room, and a defroster exhaust nozzle 18 for discharging heated air to the windshield. Main ventilation exhaust nozzles 20 are provided to discharge main air flow to the passenger compartment. A changeover damper 26 is pivotally mounted adjacent to the fresh and recirculating air intake nozzles 12 and 14 to selectively take in outside fresh air or recirculate inside air. The main unit 10 further includes a blower fan 28, a cooling core or evaporator 30, a heater core 32 and an air mixing damper 34 for mixing the high- and low-temperature airstreams in controlled proportions. Adjacent to the heater exhaust nozzle 16 is pivotally mounted a damper 36 for directing heated air to a leg room through the nozzle 16, the heater outlet damper 36 being ganged with a defroster damper 38 pivotally mounted adjacent to the defroster exhaust nozzle 18. The defroster exhaust nozzle 18 and main exhaust nozzles 20 are selectively controlled by a ventilation damper 40 located at a downstream of the duct 10 for purposes of mixing the air heated by the heater core 32 with the air bypassing it. A bypass duct 24 extends downstream from a point adjacent to the heater core 32 to a point adjacent to the main exhaust nozzles 20 to allow air to bypass the mixing damper 22. A bi-level damper 42 is located adjacent to the inlet of the bypass duct 24.

The air conditioner 10 has the following operational modes:

(1) Ventilation exhaust mode in which the heater exhaust damper 36 is operated to close the heater exhaust nozzle 16 to a nearly closed position (a small clearance is provided to allow a small amount of air to escape therethrough) and the ventilation damper 40 opens the main exhaust nozzles 20 while shutting off the nozzle 18. The bi-level damper 42 is controlled to close the bypass duct 24. This mode allows the conditioned air to be introduced into the center and side areas of the passenger compartment.

(2) Automatically controlled bi-level exhaust mode in which heater exhaust damper 36 is operated to open the heater exhaust nozzle 16 ventilation damper 40 is operated to open the manifold nozzles 20 and bi-level damper 42 is operated to close the bypass duct 24, the conditioned air being supplied through the nozzles 20 and 16 to the compartment center and side areas as well as to passengers' leg room.

(3) Manually controlled bi-level exhaust mode in which the dampers 36 and 40 are operated to respectively open the nozzles 16 and 20 and the damper 42 to open the bypass duct 24 to supply conditioned air through the nozzles 16 and 20 as in the automatic bi-level mode but differs from it in that the temperature of air supplied from the nozzles 20 is reduced somewhat due to mixture with the air not heated by the heater core 32.

(4) Heater exhaust mode in which the heater damper 36 is operated to open the heater exhaust nozzle 16 and the ventilation damper 40 is operated to close the manifold nozzles 20. The bi-level damper 42 is operated to close the bypass duct 24, the defrost damper 38 ganged to damper 42 being operated to close the defrost exhaust nozzle 18 (with a relatively large clearance to permit air to escape therethrough). This allows the leg room to be air conditioned by the nozzle 16 while allowing a 20% of the amount of the leg room air to be blasted to the windshield through the defroster exhaust nozzle 18.

(5) Defroster exhaust mode in which the heater damper 36 is operated to close the nozzle 16 (with a slight clearance) and the ventilation damper 40 is operated to close the manifold nozzles 20. The bi-level damper 42 closes the bypass duct 24 and the defroster damper 38 fully opens the defroster exhaust nozzle 18. This increases the amount of air blasted to the windshield.

Located downstream of the blower fan 28 in the main unit 10 is a blower resistor network 44 the operation of which will be described in detail later.

The air conditioner includes a plurality of vacuum responsive diaphragm-operated actuators 46, 48, 50, 52 and 54 of known construction for respectively operating the dampers 26, 34, 36, 40 and 42 in response to pressures supplied individually through respective tubes from a valve unit 62 which includes a set of five two-way valves 62a, 62b, 62e, 62f and 62g and a pair of one-way valves 62c and 62d. The valve unit 62 is supplied with vacuum pressure through tube 63b from a vacuum tank 63 which in turn receives the intake vacuum pressure of the vehicle engine (not shown) through tube 63a and is also supplied with atmospheric pressure through tube 63c, the supplied vacuum and atmospheric pressures being fed to the valves 62a to 62g. The two-way valves 62a, 62b, 62e, 62f, 62g are responsive to electrical signals respectively applied thereto to selectively apply the vacuum or atmospheric pressure to the associated diaphragm-operated actuators 52 to 58, while the one-way valves 62c and 62d are responsive to such control signals to gradually supply vacuum and atmospheric pressures respectively to the actuator 48.

A known refrigerator unit 56 of the refrigerant compression type is provided having a refrigerant compressor 56a, an expansion valve 57 which is connected to the evaporator 30 which forms part of the refrigerator unit 56. An electromagnetic clutch 64 is provided which, when operated, couples the engine output torque to the compressor 56a to supply pressurized refrigerant to the evaporator 30. The refrigerator unit 56 also includes a known flow regulator, not shown, for regulating the circulation of the pressurized refrigerant to keep the surface temperature of the evaporator 30 approximately at zero degrees centigrade.

The engine cooling water heated by the engine block is discharged from the engine cooling system to the diaphragm-operated valve 58. The purpose of this valve is to turn on and off the supply of the heated water to the heater core 32 to regulate its temperature in response to the solenoid operated valve 62f.

The blower fan 28, driven by a motor 60 is responsive to a signal applied thereto to direct a downstream of forced air in the main unit 10.

A computer-based control unit 66 provides control signals to the solenoid-operated valves of the valve unit 62, electromagnetic clutch 64 and blower motor 60 according to a control algorithm in response to signals supplied from four temperature sensors including two compartment temperature sensors 68 and 69 respectively located in front and rear portions of the passenger compartment, an ambient temperature sensor 70 located adjacent to the engine's air intake passage and a sun light temperature sensor 72 located on the instrument panel of the vehicle. A servo-position detector 74 is provided to detect the position of the output shaft of the actuator 48 which acts as a drive source for the air mixing damper 34 to control the compartment temperature. This servo-position detector 74 includes a potentiometer 74a for generating a position signal indicative of the angular position of the air mixing damper 34, a sensor 74b for detecting when the air mixing damper 34 reaches a predetermined angle where the air cooling capacity of the conditioner is at maximum, and a multi-position switch 75 which is operative stepwisely in response to the movement of the damper 34 for providing a signal to be used for determining the flow rate of the conditioned air to be supplied to the passenger compartment (the details of these sensing elements will be described later).

Manual command units 76 and 78, mounted on the front and rear seats respectively, are connected to the computer 66 for the purposes of generating command signals and visually indicating the operating conditions of the air conditioner. The front seat command unit 76 is mounted on the center portion of the instrument panel, while the rear seat command unit 78 is mounted on the backrest of the front seat.

Figure 2:
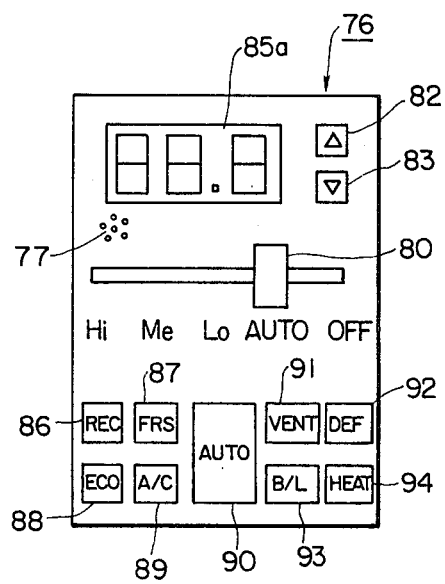
FIG. 2 is a schematic illustration of a manual command unit of a vehicle front seat.

The various switches of the front seat command unit 76 are arranged as shown in FIG. 2. In the center of its front panel is located a slide switch 80 having a plurality of switches located behind the panel for selecting the rotational speed of the blower motor 60 in one of four modes including low speed, medium speed, high speed and automatic speed control. A temperature-up resetting switch 82 and a temperature-down resetting switch 83 are located on the upper right corner of the panel 76 which is easily accessible by the vehicle driver (when the steering wheel is located on the right side of the vehicle). Adjacent to the temperature-down resetting switch 83 is a seven-segment, three-digit numerical indicator 85a for indicating the setting temperature with a precision to the first decimal place.

Mode selecting switches 86 to 94 are provided for generating the following mode selecting command signals when depressed:

(1) The signal provided by the recirculating air (REC) switch 86 causes the changeover damper 26 to open the inside air intake passage 14.

(2) The signal from the fresh air (FRS) switch 87 causes the changeover damper 28 to open the fresh air intake passage 12.

(3) The signal from the economy (ECO) switch 88 stops the operation of the cooling core 30 by switching off the refrigerator unit 56 to adjust the compartment temperature.

(4) The signal from the air conditioner (A/C) switch 89 causes the cooling core 30 to operate for temperature adjustment.

(5) The automatic mode (AUTO) switch 90 provides an instruction for automatic temperature control.

(6) The ventilation exhaust command (VENT) switch 91 provides a command signal to effect the ventilation exhaust mode described previously.

(7) The defroster exhaust command (DEF) switch 92 is used to effect the defroster exhaust mode.

(8) The bi-level exhaust command (B/L) switch 93 is used to effect the manually controlled bi-level exhaust mode.

(9) The heater exhaust command (HEAT) switch 94 is used to effect the heater exhaust mode.

The switches 82, 83, 86 to 94 are of the self-restoring push button type and each include a lamp behind the individual switch cover to make the letter indicated thereof easily discernible.

The front panel of the manual command unit 76 is formed with small openings 77 for emitting sound from a buzzer mounted behind the front panel (the operation of which will be described later).

Figure 3:
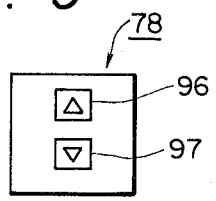
FIG. 3 is an illustration of a rear seat temperature control unit.

The rear seat manual command unit 78 is shown in FIG. 3 as comprising a temperature-up resetting switch 96 and a switch 97 for temperature-down commands each having the same operating function as the switches 82 and 83 of the manual command unit 76.

Figure 4:
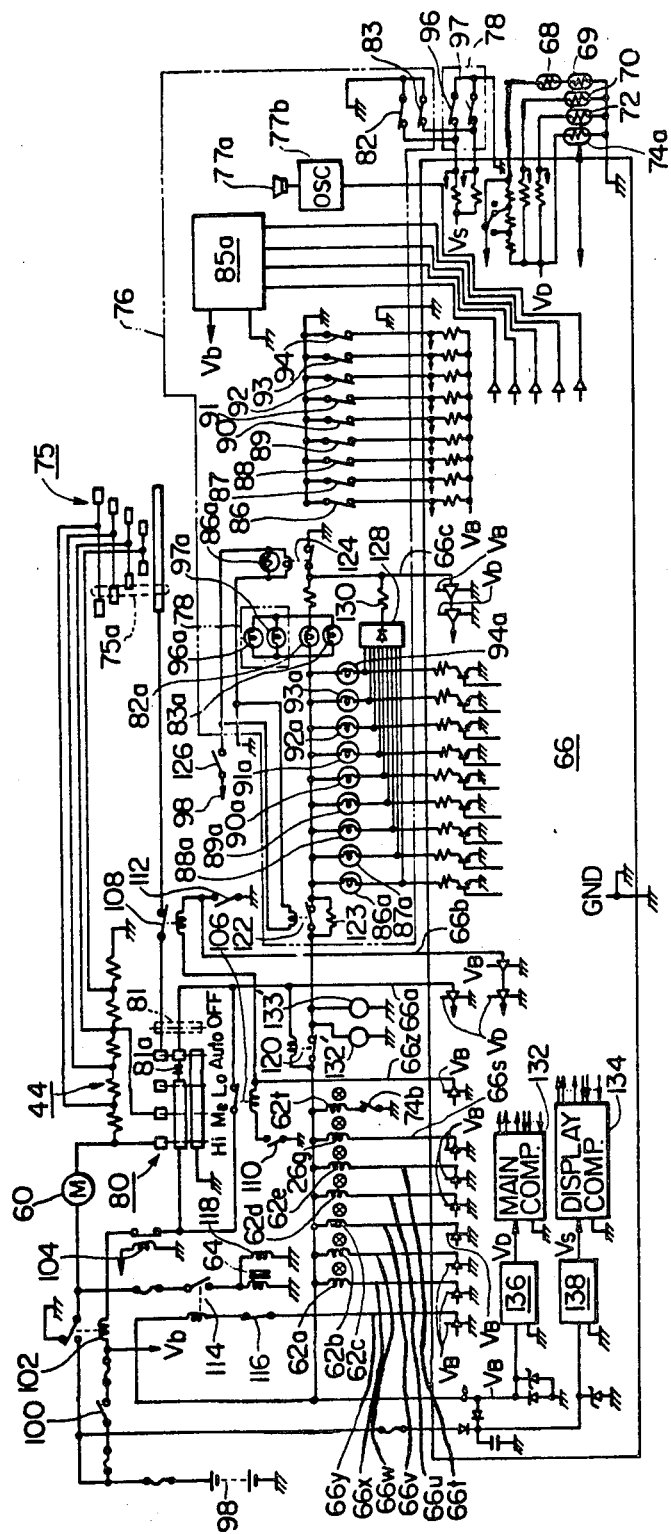
FIG. 4 is a circuit diagram of an air conditioner control system according to the invention.

An electrical diagram of the air conditioner control system of the invention is illustrated in FIG. 4.

The system is powered by the vehicle-mounted storage battery 98 through ignition key switch 100 which starts up the gasoline engine. The computer-based control unit 66 receives power from the battery directly on a power line 67a and on a power line 67b through the ignition switch 100.

A blower relay 102 is provided to connect d.c. power to one terminal of the blower motor 60 the other terminal of which is connected to ground by a parallel circuit formed by the blower resistor network 44 and the blower switch 80. The blower resistor network 44 is in turn connected to the blower switch 80 via the multi-position switch 75 of the servo-position detector 74. The blower relay 102 is energized when the moving contact element 81 of the blower switch 80 is manually moved to any one of its operative positions Hi, Me, Lo and AUTO to energize the blower motor 60. A manual operation of the switch 80 applies a signal to a line 66a so that the computer 66 is advised that the switch 80 has been moved to an operative position. If the contact 81 is moved to the Hi position the resistor network 44 is short-circuited and the full potential of the battery 98 is applied to the blower motor 60 so that it runs at a high speed. At the Me position the battery voltage is applied through three resistors of the network 44 in series to the blower motor 60 so that it runs at a medium speed. At the Lo position all resistors of the network 44 are brought into connection in a series circuit so that the motor 60 runs at a low speed.

When the blower switch 80 is in the AUTO position, the switch position of the servo-position detector 74 is stepwisely moved to short-circuit one or more resistors of the network 44 in response to the angular position of the air mixing damper 34 as the latter moves from an intermediate position to either a fully open position or a fully closed position so that the number of resistors connected in series with the blower motor 60 decreases as a function of the angle of opening of the damper 34, whereby the temperature of the conditioned air is automatically correlated with its flow rate.

A starter cutoff relay 104 is energized when the ignition key switch is brought to the starter-on position (not shown) to forcibly cut off the supply of current to the blower relay 102 in order to de-energize the blower motor 60 when the engine is being cranked.

A warmup cutoff relay 106 and a warmup low relay 108 are provided. During the time when the blower switch 80 is in the AUTO position the relays 106 and 108 are respectively operated to open their relay contacts in response to the individual closure of coolant temperature sensing switches 110 and 112 while the computer 66 is applying a potential to a line 66z. The first coolant temperature sensing switch 110 is closed when the temperature of the engine coolant water is below 30° C. (under this condition the heating power of the heater core 32 is far short of the demand) to open the warmup cutoff relay 106 and inhibit the heater relay 102 from being energized to keep the blower motor 60 inoperative. To make these circuit operations effective only during the time the blower switch 80 is in the AUTO position a backward biased diode 81a is provided therein. The second coolant temperature sensing switch 112 is closed when the coolant water reduces to a temperature lower than 50° C. at which the heater core 32 has insufficient heating capacity. The closure of switch 112 causes the warmup low relay 108 to operate, resulting in the opening of the circuit for the multi-contact switch 75 of the position detector 74. The blower motor 60 is now brought into circuit with all the resistors of the network 44 so that it runs at a minimum speed. The operation of the coolant sensing switch 112 is also signaled to the computer unit 66 through a line 66b.

It is appreciated that the blower motor 60 is operated manually in response to the selective operation of the blower switch 80 and automatically in response to the angular position of the air mixing damper 34 as well as to the temperature of the heater core 32.

A compressor relay 114 is connected in series with a low pressure sensing switch 116 in a circuit 66y from the computer unit 66. A logical "0" signal is applied to the crcuit 66y from the computer unit 66 to energize compressor relay 114 to complete a circuit for the electromagnetic clutch 64 causing the refrigerator unit 56 to start operating. The low pressure sensing switch 116 operates when the pressure at the discharge end of the cooling core 30 reduces below a predetermined level to de-energize the compressor relay 114, restoring the clutch 64 to stop the refrigerator unit 56. A solenoid 118, connected in parallel with the solenoid clutch 64, is energized simultaneously therewith for increasing the idle speed of the engine when the compressor 56a is operating for the purpose of compensating for the loss of power needed to power the refrigerator unit 56.

The solenoid valves 62a, 62b, 62c, 62d, 62e and 62g are energized by logical "0" level signals supplied from the computer unit 66 over lines 66x, 66w, 66v, 66u, 66t and 66s, respectively. On the other hand, the solenoid valve 62f, which operates the warm water valve 58, is operated in response to a sensing switch 74b of the servo-position detector 74 being closed when the air mixing damper 34 is in a position at which the air conditioner is delivering a maximum amount of cooling power.

The ON-OFF states of the valves 62a through 62f and the operating states of the various actuators are indicated as follows:

(1) Valve 62a: Turn-on of valve 62a operates actuator 50 to control heater damper 36 so that it opens the heater exhaust nozzle 16, and turn-off of valve 62a operates the actuator 50 to close the nozzle 16.

(2) Valve 62b: Turn-on of valve 62b operates actuator 54 to cause bi-level damper 36 to open the bypass duct 24, and turn-off of valve 62b causes the actuator 54 to close the bypass duct 24.

(3) Valve 62c: Turn-on of valve 62c operates actuator 48 to cause air mixing damper 34 to rotate toward the heater core 32 (toward the cooling mode position), and turn-off of valve 62c causes air mixing damper 34 to maintain its position provided that valve 62d is not turned on.

(4) Valve 62d: Turn-on of valve 62d operates actuator 48 to cause air mixing damper 34 to rotate in a direction away from the heater core 32 (toward the heating mode position), and turn-off of valve 62d causes air mixing damper 34 to maintain its position provided that valve 62c is not turned on.

(5) Valve 62e: Turn-on of valve 62e operates actuator 46 to cause switching damper 26 to open the inside air inlet 14, and turn-off of valve 62e opens the fresh air inlet 12.

(6) Valve 62f: Turn-on of valve 62f closes warm water valve 58 and turn-off of valve 62f opens the valve 58.

(7) Valve 62g: Turn-on of valve 62g operates actuator 52 to open the defroster nozzle 18, and turn-off of valve 62g causes the actuator 52 to open the manifold nozzles 20.

A blower relay 120 is responsive to the blower switch 80 being switched to any one of its operative positions from the OFF position to close its relay contacts independently of the de-energization of the blower motor 60 in response to the operation of the starter cutoff relay 104 and warmup cutoff relay 106.

The purpose of the blower relay 120 is to supply power to lamp circuits and temperature sensor motors or aspirators 132' and 133'. The aspirators 132' and 133' function to produce a suction current of air around the inside temperature sensors 68 and 69 in response to a manual input command to the blower switch 80.

The operation of the blower relay 12 connects the battery potential to the lamps 86a to 94a of mode selecting switches 86 to 94 through the normally closed contacts of a dimming relay 122, the lamps 86a to 94a being further connected over respective lines to the computer unit 66 to receive logical "0" light-up instructions therefrom.

The dimming relay 122 and a light-up relay 124 are energized simultaneously in response to a lighting switch 126 of the vehicle being manually operated. The dimming relay 122 opens its contacts and connects a current limiting resistor 123 to the lamps 86a to 94a to dim the light level of these lamps during nighttime driving. The light-up relay 124, on the other hand, closes its contacts to energize the lamps 82a, 83a of the front seat temperature-up and temperature-down command switches 82, 83 and the lamps 96a, 97a of the rear seat temperature-up and temperature-down resetting switches 96, 97. Simultaneously, the lamps 86a to 94a are connected through a circuit including a diode 128 and a resistor 130 to the computer unit 66. The purpose of this diode-resistor circuit is to enable these indicator lamps to glow simultaneously at a light level slightly lower than when they are individually energized in response to light-up command signals from the computer unit 66. The throwing of the lighting switch 126 and hence the operation of the relay 124 further applies a signal to the computer unit 66 through a line 66c.

A lamp 80a, connected in parallel with the winding of the light-up relay 124, is mounted behind the front panel of the front-seat manual command unit 76 to light up the letters "OFF", "AUTO", "Lo", "Me" and "Hi" from the inside.

The mode selecting switches or pushbuttons 86 to 94 have their first terminals connected in common to ground and their second terminals connected respectively to the computer unit 66 to apply thereto logical "0" command signals when manually depressed.

The temperature-up resetting switches 82 and 96 of the front and rear seat command units have their stationary contacts connected in common to the computer unit 66 and their moving contacts connected to ground, and the temperature-down resetting switches 83 and 97 have their stationary contacts connected in common to the computer unit 66 on a separate line and their moving contacts connected to ground, so that the computer unit 66 is supplied with a common temperature-up signal and a common temperature-down command signal from the front and rear command units.

A display unit 85 including the three-digit numeral indicator 85a is provided in the front seat command unit and connected to respond to signals from the computer unit 66. Furthermore, the buzzer 77a of the front seat command unit is driven by an oscillator 77b which is enabled in response to a signal from the computer unit 66.

The temperature sensors 68, 69, 70 and 72 comprise negative-resistance type thermistors among which the inside temperature sensors 68 and 69 are connected in series to the computer unit 66 and the outside and sunlight direct exposure temperature sensors 70 and 72 are individually connected to the computer unit for application thereto of analog temperature signals. The resistance values and temperature coefficients of the inside temperature sensors 68 and 69 are proportioned with each other so that the signal derived from the front sensor 68 is emphasized with respect to the signal derived from the rear sensor 69. The voltage developed at the wiper tap point of the potentiometer 75a of the servo-position detector 74 is also applied to the computer unit 66.

Figure 5:
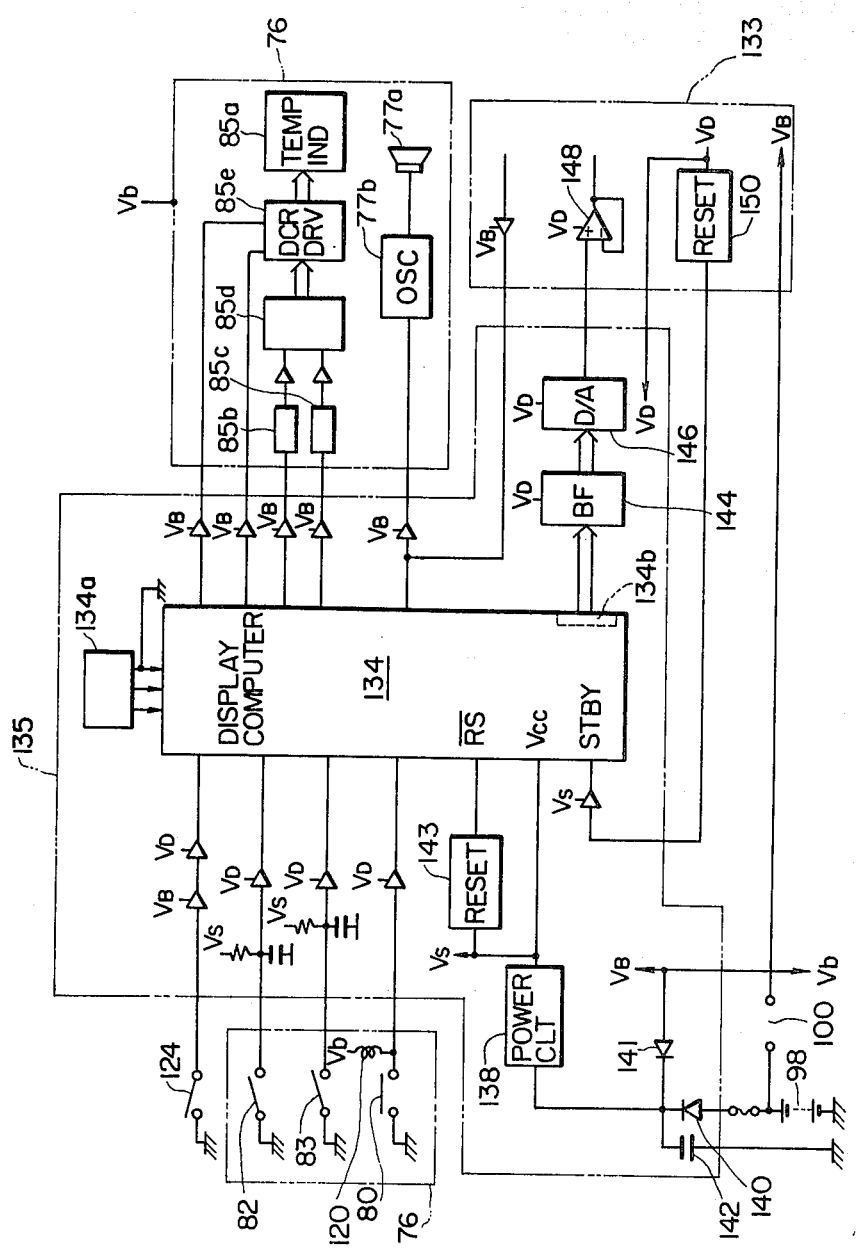
FIG. 5 is a block diagram of the computer unit of FIG. 4.

As will be described in detail later, the computer unit 66 is broadly divided into a main control circuit 133 which controls the operation of the air conditioner main unit 10 and a display control circuit 135 which monitors the reference temperature (see FIG. 5). The control circuits 133 and 135 respectively include a main microcomputer 132 and a display microcomputer 134 which are provided respectively with constant voltage sources 136 and 138. The main microcomputer 132 is powered in response to the ignition key switch 100 being turned on, while the power to the display microcomputer 134 is constantly applied. The computer unit 66 includes buffers and interfaces for exchanging various data between previously described external units and the microcomputer 132 and 134.

The display control function of the computer unit 66 will now be described with reference to FIGS. 5, 6 and 7. In FIG. 5, the front seat manual command unit 76 further includes a pair of photocouplers 85b and 85c for optically transmitting clock and display data to a shift register 85d in which the transmitted data are shifted in a group of four bits each. A decoder/driver 85e is connected to the shift register 85e to receive data therefrom in the form of 3×4 bits for decoding them into an appropriate bit pattern and latch and display blanking data from the microcomputer 134 for deriving display instruction signals which will be used to drive the three-digit numerical indicator 85a. The indicator 85a, photocouplers 85b, 85c, shift register 85a, and decoder/driver 85e constitute the display unit 85.

The display control circuit 135 further comprises a clock source 134a which supplies standard clock pulses at a several MHz to the display microcomputer 134 (type MB-8851 available from Fujitsu, Ltd) diodes 140, 141 and a capacitor 142 and a resetting circuit 143 for generating a reset signal by detecting when the output of the constant voltage source 138 reaches the rated voltage level. Temperature setting data are issued from a latched port 134b of the display computer 134 to a buffer 144 whose output is coupled to a digital-analog converter 146 where it is converted into a corresponding analog signal which is applied to a voltage follower 148 and thence to an analog input of the main control circuit 133. Another resetting circuit 150 detects the instant the main computer 132 starts operating and applies a signal to the display computer 134.

Upon receipt of resetting signals on terminals Vcc and RS, the display computer 134 is brought into operation and proceeds to operate on signals received from the lighting relay 124, temperature-up resetting switch 82, temperature-down resetting switch 83, (signals from corresponding temperature up-down switches of the rear seat) and blower switch 88 and generates display instruction signals (latch, blank, clock and numerical data). These signals are loaded into the shift register 85d and decoder/driver 85e. To the oscillator 77b is applied signals from the main control circuit 133 in response to the operation of the mode selector switches 86 to 94 as well as a buzzer on-off control signal from the display computer 134. The display computer 134 further receives an enabling signal at standby terminal STBY from the resetting circuit 150 to continue its normal data processing functions as long as the enabling signal is present when the main computer 132 is operating. When the enabling signal is removed from the standby terminal in response to the shutdown of the main computer 132, the display computer 134 maintains its latest status in a standby condition ready to reinitiate its operation at the instant the enabling signal is reapplied.

Figure 6:
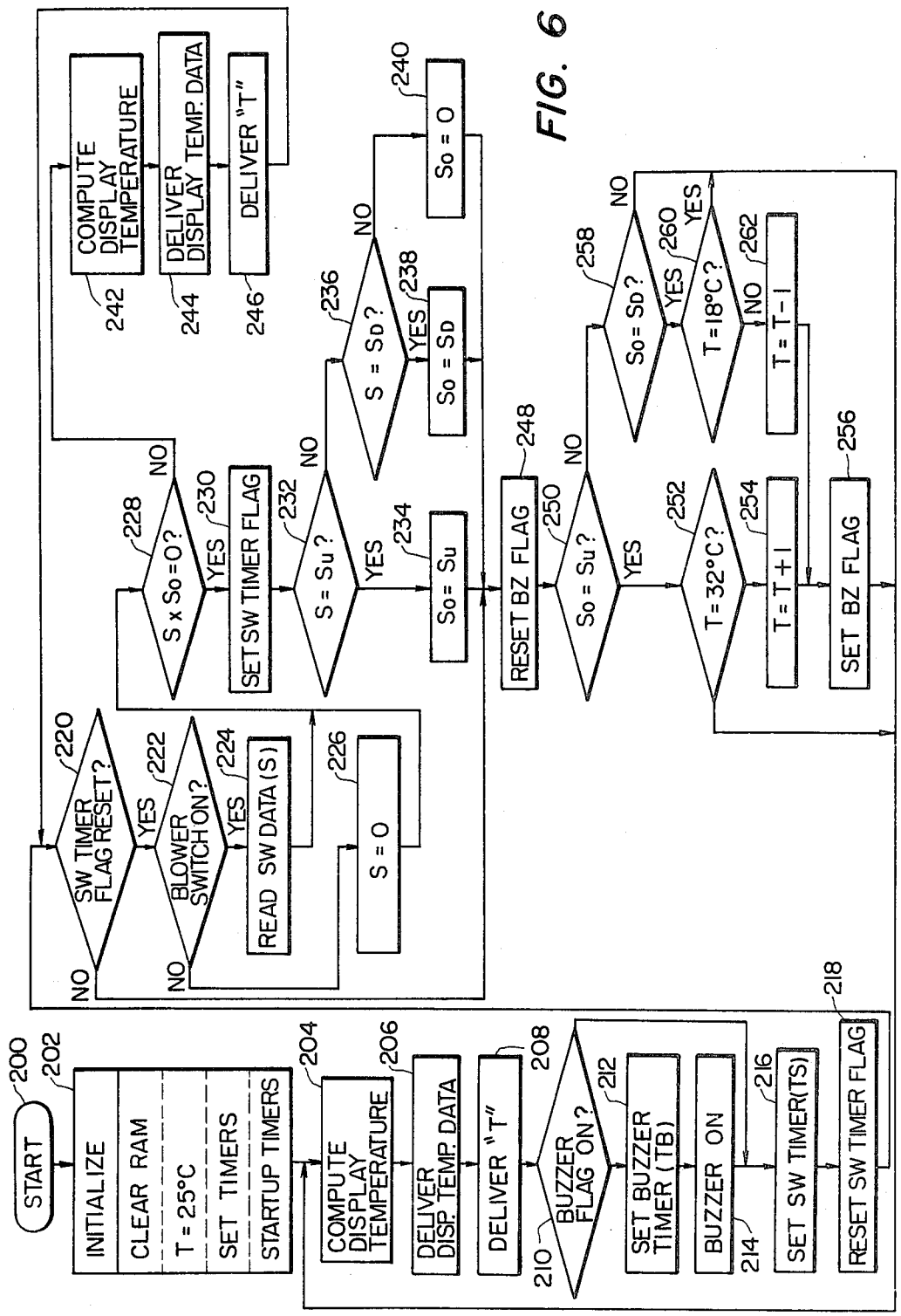
FIG. 6 is a flow diagram illustrating a main routine associated with the display computer of FIG. 5.
Figure 7:
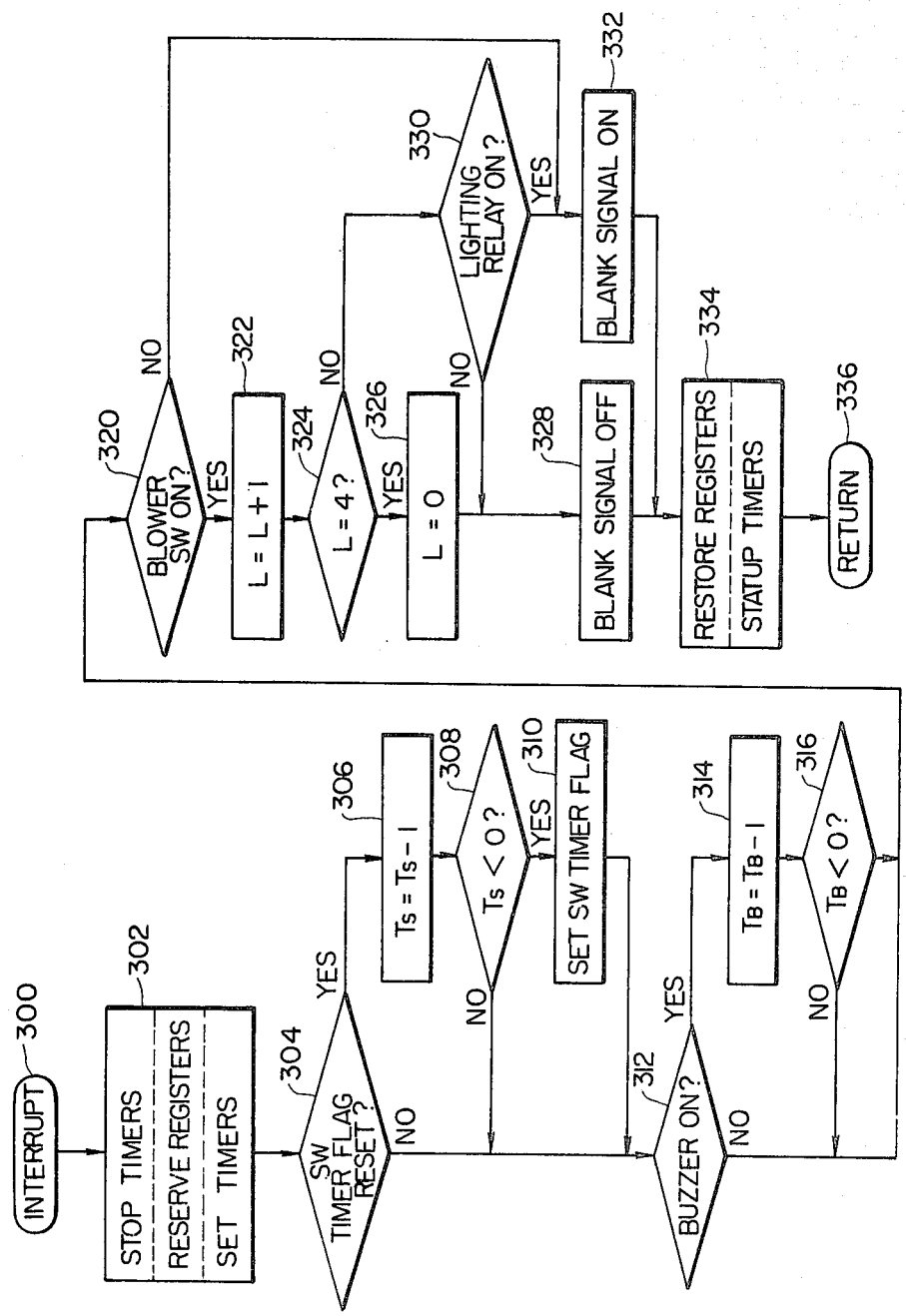
FIG. 7 is a flow diagram illustrating an interrupt routine associated with the display computer.

FIG. 6 is an illustration of a flowchart of the main routine of the display computer 134 and FIG. 7 a flowchart of its interrupt routine which is executed at predetermined intervals.

As mentioned above, the display computer 134 is ready to start operating when it receives d.c. power from the constant voltage source 138 and a resetting signal is applied thereto from the resetting circuit 143. Under this condition, the turn-on of the ignition key switch 100 causes the main computer 132 to be put into an operating state, which is detected by the resetting circuit 150 applying an enabling signal to the standby terminal STBY of computer 134. The display computer 134 initiates its data processing functions starting at step 200, shown in FIG. 6, then proceeding to an initializing step 202. In this initializing step the display computer 134 clears the various data areas of its random access memory (which will be described later in detail) and sets the reference temperature data T to a value corresponding to 25° C. and starts up its built-in timer.

The main routine is started at step 204 in which the reference temperature data T is converted into a three-digit data word for indication of the reference temperature in digital values of the tenth, unit and first decimal place. The converted data is loaded into a prescribed storage location of the RAM. A step 206 is then executed to read out the stored data words out of the RAM into the shift register 85d sequentially from the tenth data word to the first decimal place data word in response to clock pulses through the photocouplers 85b and 85c and a latching signal is applied to the decoder/driver 85e. The 3-digit temperature data is thus maintained in the decoder/driver 85e which then drives the indicator 85a in the absence of the display blanking signal. At step 208 the setting temperature data T is also transferred to the latched port 134b and thence to the buffer 144 and to the digital-analog converter 146 for application of the analog converted reference temperature signal through the voltage follower 148 to the main control circuit 133.

A buzzer flag check step 210 is then executed by checking a buzzer flag to see if it has already been set in the prescribed storage location of the RAM in a manner as will be described later, and if so, a "yes" decision route will be taken to a step 212 to store a timer data word representing an interval of approximately 50 milliseconds of the buzzer timer TB into a predetermined storage location of the RAM. The buzzer timer setting step 212 is followed by a further execution step 214 wherein a "turn-on buzzer" signal is applied to the oscillator 77b to generate a buzzing sound from the buzzer 77a. If the buzzer timer flag has already been reset, a "no" decision route will be taken from the checking step 210 to a switch timer setting step 216 wherein a timer data word representing an interval of about 500 milliseconds of switch timer TS is stored in a prescribed storage location of the RAM. A switch timer flag resetting step 218 is then executed by resetting the switch timer flag in the RAM.

A checking step 220 now follows to check to see if the switch timer flag has been reset. If not, a "no" decision route will be taken to a buzzer flag reset step 248 to reset the buzzer flag. If the switch timer flag has been reset, a "yes" decision route is taken to another check step 222 in which the operating state of the blower switch 80 is checked. If the blower switch 80 remains open (i.e., the air conditioner is not operating), a "no" decision route will be taken to a switch data resetting step 226 to reset the switch data equal to "0" to prevent the alteration of the reference temperature. If the blower switch 80 has been turned on, a "yes" decision route will be taken to a switch data input step 224 to receive operating status data word S from the temperature-up and temperature-down resetting switch 82 (96) or 83 (97) in parallel form. At step 228 the switch data word S is multiplied by an old switch data word So which will be described and the result of the multiplication is checked to see if the result is "0". If the multiplication does not result in "0" as in cases where either of the temperature resetting switches 82, 96, 83, 97 remains operated and the data words S and So contain temperature-up data word SU or temperature-down data word SD, a "no" decision will be made, and if otherwise, the multiplication will result in a "yes" decision.

If "no" decision is made in the step 228, the display computer 134 will then proceed to a step 230 in order to set the switch timer flag and then proceeds to a checking step 232 to determine whether the switch data word S is a temperature-up data word SU or not. If affirmative, a "yes" decision route will be taken to a step 234 to update the old switch data word S with the temperature-up data word SU, and if negative, a "no" decision route will be taken to a temperature-down switch check step 236 to check to see if the switch data word S is a temperature-down data word SD or not. If affirmative, a "yes" decision route will be taken to a step 238 to update the switch data word S with the temperature-down data word SD and if negative, a "no" decision route will be taken to a switch data reset step 240 to reset the old switch data So equal to "0". After executing either one of the steps 234, 238 and 240, the computer 134 advances to the buzzer flag resetting step 248.

On the other hand, if "no" decision is made in the switch status check step 228 (i.e., either temperature-up or temperature-down switch remains operated), steps 242, 244 and 246 are successively executed in the same manner as in the previous steps 204, 206 and 208, and the program now returns to the step 220.

In summary, the steps 220 to 246 are executed in the following orders according to different operating conditions:

Case 1:
If the blower switch 80 is closed and neither temperature-up or temperature-down resetting switch is being depressed, or both temperature command switches are being simultaneously depressed, steps 220, 222, 224, 228, 230, 232, 236 and 240 will be executed in sequence.

Case 2:
If, with the blower switch 80 being closed the temperature-up resetting switch 82 or 96 is depressed, steps 220, 222, 224, 228, 230, 232 and 234 will be executed in sequence.

Case 3:
If, with the blower switch 80 being closed, the temperature-down resetting switch 83 or 97 is depressed, steps 220, 222, 224, 228, 230, 232, 236 and 238 will be executed in sequence.

Case 4:
If the blower switch 80 is closed and both temperature command switches are being depressed, steps 220, 222, 224, 228, 242, 244, 246 and 220 will be executed in sequence.

Case 5:
If the blower switch is open, steps 220, 222, 226, 228, 230, 232, 236 and 240 will be sequentially executed.

It is to be noted that, since the switch timer flag is reset each time the switch timer flag resetting step 218 is executed, "yes" decision is made subsequently at step 220 and "no" decision is made at step 220 only in Case 4 in which the switch timer flag is set after the 500-ms interval of the switch timer TS is counted in an interrupt routine which will be described hereinafter.

In the subsequent step 248 the buzzer flag is reset and at step 250 the old temperature data So is checked against the temperature-up command data word SU. If coincidence occurs between them, a subsequent step 252 is executed to check for the reference temperature data word T to see if it corresponds to an upper limit value of 32° C. If no coincidence occurs, "no" decision route is taken to a step 254 to add "1" to the reference temperature data word T so that the temperature setting is increased by 0.5° C. A step 256 is then executed to set the buzzer flag to energize the buzzer 77a. If the reference temperature data word T corresponds to the upper limit, the steps 254 and 256 are skipped and the program returns to the step 204.

On the other hand, if no decision is made at step 250 a step 258 is executed to check the old temperature data word So against the temperature-down command data word SD. If coincidence occurs, the reference temperature data word T is checked against a lower limit of 18° C. at step 260 and if "no" decision is made in this step, "1" is subtracted from T at step 262 before the program proceeds to the buzzer flag setting step 256.

The steps 260, 262 and 256 are skipped when So=SD does not occur in the step 258. Similarly, if T=18° C. occurs in the step 260, the steps 262 and 256 are not executed. In both cases the step 204 is executed to repeat the above process.

When the reference temperature data T is updated in the step 254 or 262, the updated temperature data is also converted into a corresponding 3-digit display data word in the step 204, so that in the subsequent step 206 the reference temperature displayed on the indicator 85a is altered by 0.5° C. and accordingly the temperature setting data T supplied to the main control circuit 133 at step 208 is also updated by 0.5° C. In this case a subsequent execution of the step 210 results in a "yes" decision to execute the steps 212 and 214 in succession to generate a buzzing sound since the "set buzzer flag" step 256 has been executed previously. This buzzing sound continues for an interval of 50 ms during which the buzzer timer TB is counted in an interrupt routine.

The main routine just described is repeatedly executed at 50-ms intervals, while the interrupt routine (FIG. 7) is executed at intervals of several hundreds microseconds using a built-in timer. More specifically, when the built-in timer is filled with a full count, an interrupt routine is started at step 300 (see FIG. 7). Subsequently executed is a step 302 in which the built-in timer is disabled, the various registers are put in a state of readiness for storing data generated in the interrupt routine and the built-in timer is then set. At step 304 a "yes" decision will issue if the switch timer flag has been reset in the main routine to execute a step 306 to subtract "1" from the switch timer data word TS. A subsequent step 308 checks to see if TS is smaller than "0". If manual operation of the temperature-up or temperature-down resetting switch continues so that the main routine is recyclically executing its steps 220 to 246 for a period of about 500 ms, the decision at the step 308 switches to "yes" and the switch timer flag is set in a subsequent step 310. Therefore, in a subsequent main routine operation a "yes" decision will issue from the check step 220.

A step 312 is executed to check to see if the buzzer oscillator command signal is "ON" upon execution of the step 310 or if "no" decision is made at step 304 or 308. Subsequently executed is a step 314 if "yes" decision is made at step 312 to subtract "1" from the buzzer timer data word TB, the decremented data word TB being checked in a subsequent step 316 to see if it becomes smaller than "0". The step 316 will issue a "yes" descision when an interval of about 50 ms has elapsed from the instant the buzzer time TB is set at step 212. Upon termination of the 50 ms interval, the buzzer is turned off at step 318 by issuing a buzzer turn-off command to the oscillator 77b.

If "no" decision is made at step 312 or 316 or if the buzzer turn-off command step 318 has been executed, a check step 320 will follow to determine whether the blower switch has been turned on, and if not, a "no" decision route will be taken to a step 332 to issue a blanking, or indicator disabling signal to the decoder/driver 85e to disable the temperature indicator 85a. If the blower switch has been turned on provided that the lighting relay 124 remains de-energized, the display computer goes through a first string of steps 322, 324, 326 and 328 or goes through a second string of steps 322, 324, 330 and 328 and repeats these steps so that the steps of the second string are repeatedly executed three times as many as the number the steps in the first string are repeatedly executed. More specifically, at step 322 a repetition number data word L stored in the RAM is incremented by "1" and at step 324, the data L is checked against "4". If no coincidence occurs between them, the step 330 will follow to check to see if the lighting relay has been energized, and if not, an indicator enabling signal is generated at step 328 to light up the indicator 85a. If coincidence occurs in the step 324, the step 326 will follow to set the data L equal to "0" and issues an indicator enabling signal at step 328. The step 328 is also executed when "no" decision is made at step 330. As a result, the indicator 85a is shone at full brightness. If the lighting relay has been energized, a "yes" decision route will be taken from the step 330 to step 332 to generate a blanking signal to the decoder/driver 85e. As a result the display computer follows a third string of steps 322, 324, 330 and 332 and repeats these steps three times as many as it repeats the steps of the first string, so that the indicator 85a is dimmed for night driving.

At step 334, the registers are returned to the original state ready for storing data generated in a subsequent execution of the main routine, and the built-in timer is initiated to permit the computer to go to the return step 336 to resume the interrupted main routine operation.

The operation of FIGS. 6 and 7 can be summarized as follows:

(1) The indication and alteration of the reference temperature are inhibited when the blower switch 80 is open.

(2) The reference temperature is varied with an incremental step of 0.5° C. within a range between 18° C. and 32° C. and the buzzer 77a is sounded for a period of 50 ms in response to the operation of the temperature-up resetting switch 82 (96) or temperature-down resetting switch 83 (97) during the time when the blower switch 80 is closed.

(3) If the operation of the temperature resetting switch continues, the reference temperature data is varied with an incremental step of 0.5° C. to 500-ms intervals within the range between 18° C. and 32° C. with a buzzing sound generated in response to each temperature updating.

(4) The reference temperature is not altered when the resetting switch is operated if the reference temperature has reached the upper or lower limit.

(5) The indicator 85a is dimmed when the lighting relay 124 is operated.

Since the display computer 134 is powered by the stabilized voltage source 138 at all times, this computer is constantly in a state of readiness to perform its data processing functions regardless of the operation of the ignition key switch 100. However, the main computer 132 is shutdown when the ignition key 100 is turned off and when this occurs it removes the resetting signal from the standby (STBY) terminal of the display computer 134 so that the latter is put into a stand by state in which it freezes the latest operating status. Therefore, the display computer 134 resumes its operation according to the operating status of the main computer 132 in response to the ON-OFF operation of the ignition key 100.

Figure 8:
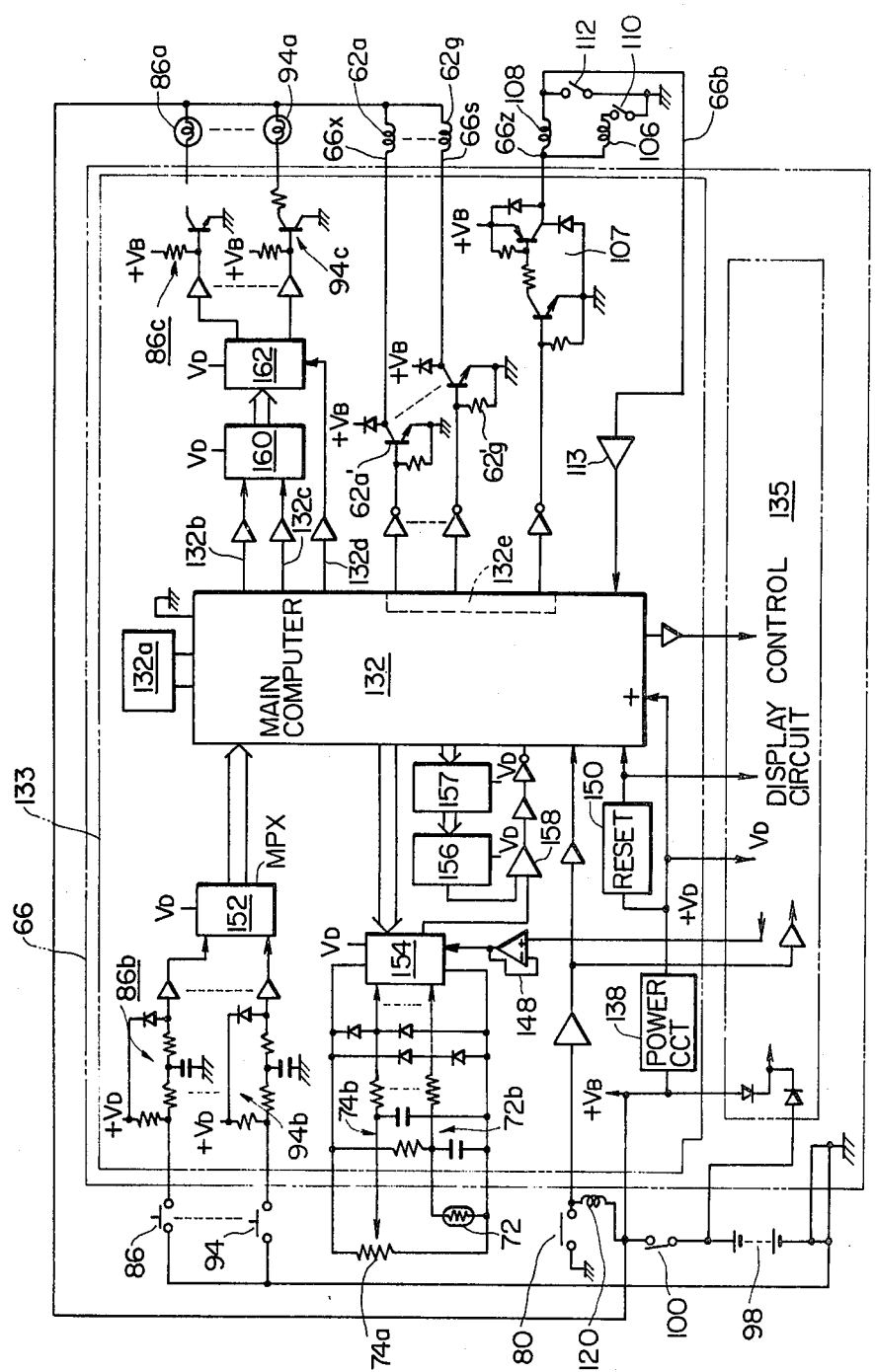
FIG. 8 is a circuit diagram associated with a main computer of FIG. 5.

The details of the main control circuit 133 will now be described with reference to FIGS. 8 to 20 wherein FIG. 8 is an illustration of the internal structure of the main control circuit 133 and its associated circuits.

The mode selecting switches 86 to 94 are coupled to an encoder 152 through respective input circuits 86b to 94b (partially omitted for simplicity). The encoder 152 translates the input signal into a 4-bit parallel binary code signal for application to the main computer 132.

The main computer 132 is a microcomputer of the type MB-8841 available from Fujitsu, Ltd. The computer 132 includes a clock source 132a and receives a resetting signal from the resetting circuit 150 when it detects the rising edge of the voltage supplied from the voltage stabilizer 138.

The signal representing the angular position of the air mixing damper 34 is supplied from the potentiometer 75a through an analog input circuit to a multiplexer 154 to which is also applied a set of signals from the temperature sensors 68, 69, 70 and 72 through respective analog input circuits. Further applied to the multiplexer 154 is an analog signal representing the reference temperature from the display computer 134 through voltage follower 148. The multiplexer 154 provides selection of one of the input signals according to an instruction given by the computer 132.

The signal selected by the multiplexer 154 is applied to an analog-digital converter formed by a buffer 157, a ladder resistor network 156 and a comparator 158. The ladder resistor network 156 generates a reference voltage corresponding to a digital code supplied to the buffer 157 from the computer 132. The comparator 158 compares the signal from the multiplexer 154 with the reference voltage so that it generates a signal digitally representing each of the analog inputs supplied to the multiplexer 154.

A shift register 160 is provided to convert a serial data signal and a clock pulse train on leads 132b and 132c from the computer 132 into a parallel code which is applied to a latch 162 in which the parallel code is latched in response to a latch pulse on lead 132d from the computer 132. The latch 162 provides the parallel code to the lamp circuits 86a to 94a of the mode selecting switches 86 to 94 through respective drive circuits 86c to 94c, so that one of these lamps is lit in response to the signals on leads 132b, 132c, 132d according to an instruction given by the computer 132.

The main computer 132 energizes the solenoid valves 62a to 62g through respective drive circuits 62a' to 62g' by signals applied to the latched port 132e to operate the air conditioner in one of the previously described operational modes.

The computer 132 energizes the warmup cutoff relay 106 and warmup low relay 108 through a drive circuit 107 in response to a signal applied to the latched port 132e. The second temperature sensing switch 112 applies its ON-OFF signal through an input amplifier 113 to the main computer 132. The computer 132 is also provided with a terminal for delivering a buzzer sounding command signal to the display control circuit 135.

The operation of the main computer 132 will now be described with reference to FIGS. 9 to 20. The control program of the main computer 132 is formulated on a trial and error basis according to the user manual, experiments and the specifications drafted by the customers and characterizes the operating functions of the main computer 132 in an identical manner to the control program of the display computer and written into its read only memory.

Figure 9:
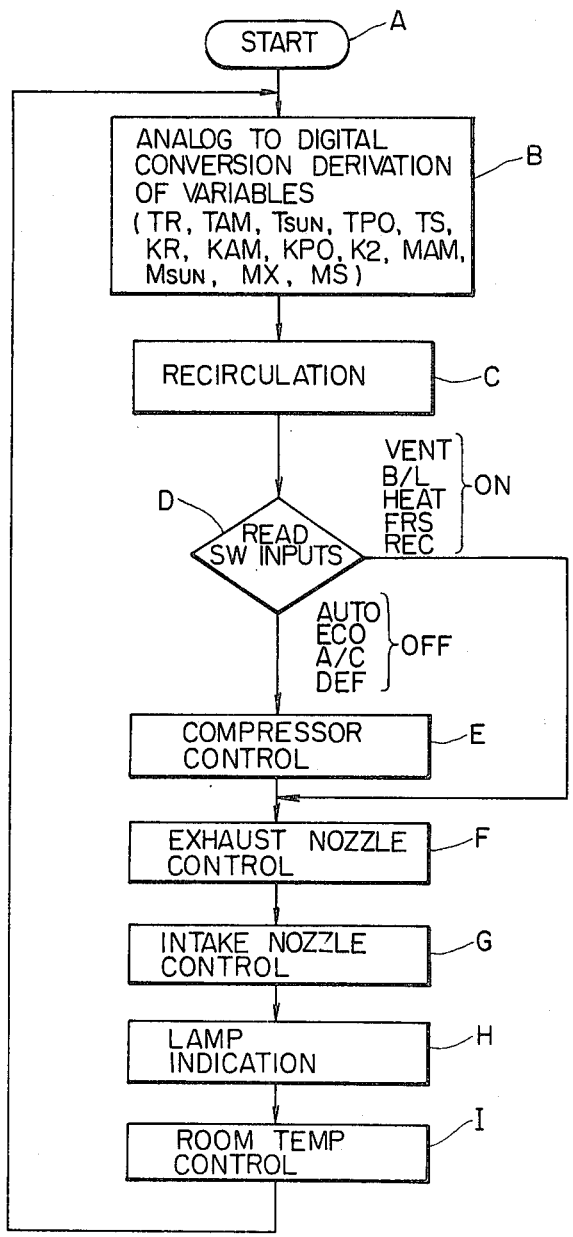
FIG. 9 is a flow diagram illustrating a general control program of the main computer.

FIG. 9 is an illustration of an overall flow diagram of the control algorithm of the main computer 132 which is broadly divided into the following blocks connected in a closed loop:

Block A:

Startup routine which controls the starting of the program from the starting address and the initializing of its registers, memories and input-output ports in response to the operation of the ignition key switch 100 by receiving a reset signal from the reset circuit 150 generated simultaneously with the starting of the main control circuit 133.

Block B:

Analog input routine in which the analog input signals applied to the multiplexer 154 are sequentially converted into corresponding digital signals which are modified by specified constants into control variables and stored in the RAM.

Block C:

Forced airflow control routine in which the computer provides ON-OFF control of the solenoid valve 62c and electromagnetic clutch 64, and monitors the operating conditions of the fresh air switch 87, coolant temperature sensing switch 112, built-in timer (Tim 2) and air mixing damper 34 in order to control the outside and inside air intake nozzles 12 and 14.

Block D:

Switch data read-in routine in which the computer reads in signals from the mode selecting switches 86 to 94 through the encoder 152 to set or reset flags associated with the mode switches and energize the buzzer 77a when each of the mode switches is initially operated.

Block E:

Compressor control routine in which the clutch 64 is controlled in accordance with the operation of ECONO switch 88 or air conditioner (A/C) switch 89 when the AUTO switch 90 is not operated and the clutch 64 is further controlled when the AUTO switch 90 is operated in response to a signal derived by the computer coordinating various factors including the difference between the reference temperature (Ts) and the outside or ambient temperature (Tam), the measured angular position (Tpc) of the air mixing damper 34, the latest operation state of the clutch 64 and an estimated angular position (Kpo-Mx) of the air mixing damper 34.

Block F:

Exhaust nozzle control routine in which the computer issues control signals to the solenoid valves 62a, 62b, 62e and 62g when the vent switch 91, defroster switch 92, bi-level switch 93 or heat switch 94 is operated to effect the desired exhaust mode. When the AUTO switch 90 is operated the computer controls the heater exhaust, bi-level exhaust and manifold exhaust modes in response to the angular position (Kpo) of the air mixing damper 34 and correction data (Ms). Mode indication lamps 88a to 94a are also lit according to the automatically selected exhaust mode. When the ignition key switch 100 is turned on with the blower switch 80 being in the OFF position, all the mode indicator lamps are extinguished.

Block G:

Intake air control routine in which the computer provides control on the outside air intake nozzle 12 and inside air intake nozzle 14 in response to the operating state of the defroster switch 94a and the result of the forced airflow control routine C. The mode indicator lamps 86a and 87a are also controlled in the same manner as in the exhaust nozzle control routine F.

Block H:

Lamp indication routine in which the computer applies control signals to the shift register 160 and latch 162 on leads 132b, 132c and 132d to control the ON-OFF state of the mode indicator lamps 86a to 94a according to the selected mode.

Block I:

Temperature control routine in which the ON-OFF states of the solenoid valves 62c and 62d are determined to control the air mixing damper 34 according to the inside or room temperature (TR), ambient temperature (TAM), angular position (KPO) of the air mixing damper 34 and other factors including (a) the ON-OFF state of the clutch 64, (b) the amount of sun light and (c) ambient temperature correction data (MX, Msun, MAM).

Details of the various routines of FIG. 9 will now be described with reference to FIGS. 10 to 20.

Figure 10:
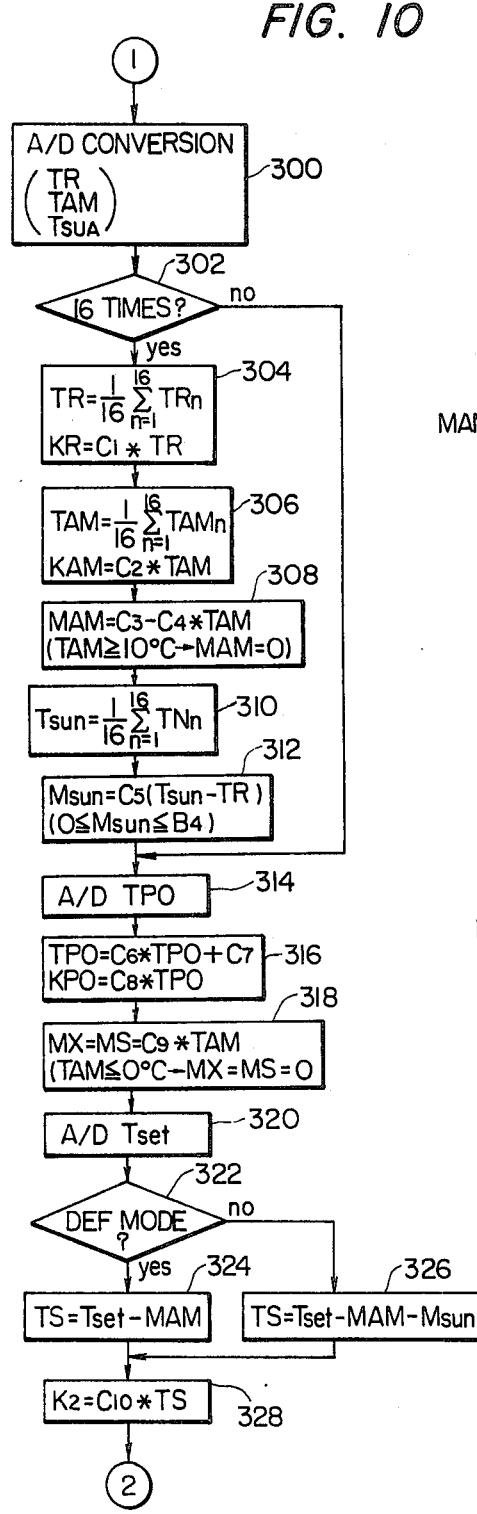
FIG. 10 is a flow diagram illustrating an analog signal input routine of the general control program.

FIG. 10 is an illustration of the detail of the analog input routine B of FIG. 9. In successive steps 300 to 312 the following operations are performed:

(a) the compartment temperature (TR), ambient temperature (TAM) and direct sun light temperature (Tsun) are repeatedly measured 16 times and their average values are computed from the measured values.

Figure 11:
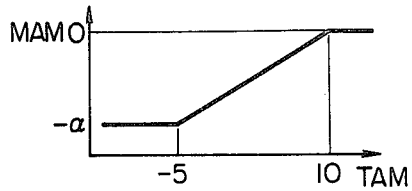
FIGS. 11 and 12 are graphic illustrations of transfer characteristics used to correct temperature indicating data.

(b) Data KR, KAM, MAM and Msun are computed using experimentally derived controlling constants C1 to C5 are follows:

(c) At step 308 ambient temperature correction data MAM is derived so that it is correlated to the averaged ambient temperature TAM as graphically shown in FIG. 11.

Figure 12:
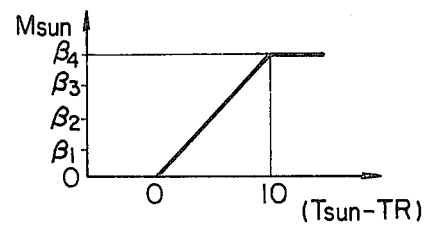

(d) At step 309 correction data Msun for direct sun light temperature are derived from the relation graphically shown in FIG. 12.

(e) At steps 314 to 318 the angular position data TPO of the air mixing damper 34 is read to correct the data TPO by multiplying the read out TPO value by a constant C6 and summing with a constant C7, and data KPO, which is used exclusively for computational purposes, are derived multiplying the corrected TPO value with a constant C8. Also derived are correction data MX and MS by multiplying the ambient temperature data TAM with a constant C9.

(f) At steps 320 to 328 an analog signal indicating the reference or setting temperature value Tset is applied from an external source to the computer to derive reference temperature data TS with modifying Tset by the previously derived correction data MAM and Msun. Data K2 are also derived with multiplying the reference temperature TS by a constant C10.

Figure 13:
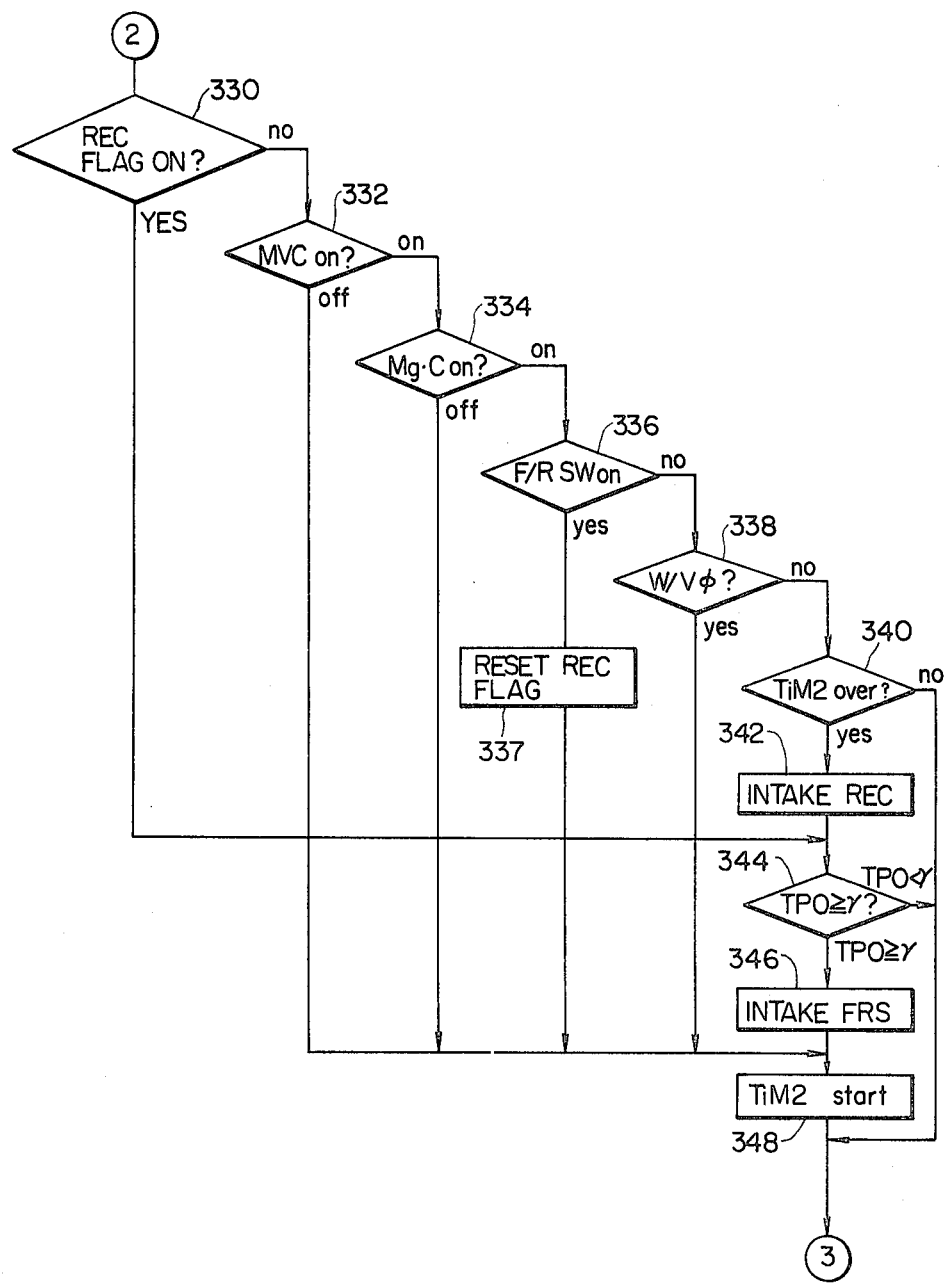
FIG. 13 is a flow diagram of a forced air control routine of the control program.

The detail of the forced airflow control routine C of FIG. 9 is illustrated in FIG. 13.

(a) At step 330 forced airflow flag is checked to see if it has already been set. This flag is reset in the startup routine A, and at steps 337 and 246, and set at step 342 during the inside air intake mode.

(b) At steps 332, 334, 340 the air cooling capacity is checked. If the cooling capacity runs short of a specified power level, the air conditioner is switched to the air recirculating mode at step 342. At step 344 the angular position data TPO of the air mixing damper 34 are checked against a specified value "γ" which corresponds to 4° C. on the cooling side of the damper 34 and if data TPO are equal to or greater than the specified value a step 346 follows to effect the outside air intake mode.

(c) At step 336 operation of the recirculating air intake switch 86 or fresh air intake switch 87 is detected to skip the step 342.

(d) At step 338 engine warmup condition is detected by monitoring a closing of the coolant temperature sensor 112 to skip the step 342.

The switch data read-in routine D is shown in detail in FIG. 14 which includes the following operations:

(a) At step 350 an ON-OFF state signal from the encoder 152 is stored temporarily in an accumulator and which one of the mode selecting switches 86 to 94 is operated is determined by steps 352, 356, 358, 360, 362, 364, 366, 370 and 372.

(b) Defroster mode is detected at step 354 by checking to see if defroster switch flag is ON. If this occurs the input from any one of switches ECONO, A/C, DEF, FRS and REC is rejected.

(c) When one of the mode selecting switches is turned on so that the result of any one of the nine checking steps 352 to 372 is affirmative, an associated one of the subsequent steps 353a, 357, 359, 361, 363, 365, 367, 371 and 373 will follow to set up a mode indicator flag. To each flag is assigned eight bits #1 to #8 which are used to designate the following conditions:

The #1 bit indicates the on-state of the recirculating air intake switch 86 or off-state of the fresh air intake switch 87;

The #2 bit indicates the on-off states of the AUTO switch 90;

The #3 bit indicates the on-off states of the ECONO switch 88;

The #4 bit indicates the on-off states of the air conditioner A/C switch 89;

The #5 bit indicates the on-off states of the defroster switch 92;

The #6 bit indicates the on-off states of the ventilation switch 91;

The #7 bit indicates the on-off states of the bi-level switch 93; and

The #8 bit indicates the on-off states of the heat switch 94.

(d) Detail of each flag setup procedure is shown in FIG. 15. At step 380 a switch flag-on state is checked, if the flag is off, a flag is setup at step 382 and at step 384 a buzzer flag is set. The buzzer flag continues to energize the buzzer 77a until an interrupt program, not shown, counts several hundreds milliseconds in a manner similar to that provided by the display computer 134.

(e) When the AUTO switch 90 is operated, the buzzer sounding operation just described above and the resetting operation are effected in respect of all the other eight switch flags at step 353a in addition to the AUTO switch flag setup operation.

(f) At step 353b a decision is made to open the air fresh intake nozzle 14 in response to the operation of the AUTO mode switch 90 and subsequently at step 353c a decision is made to turn on the associated lamp 90a.

Figure 16:
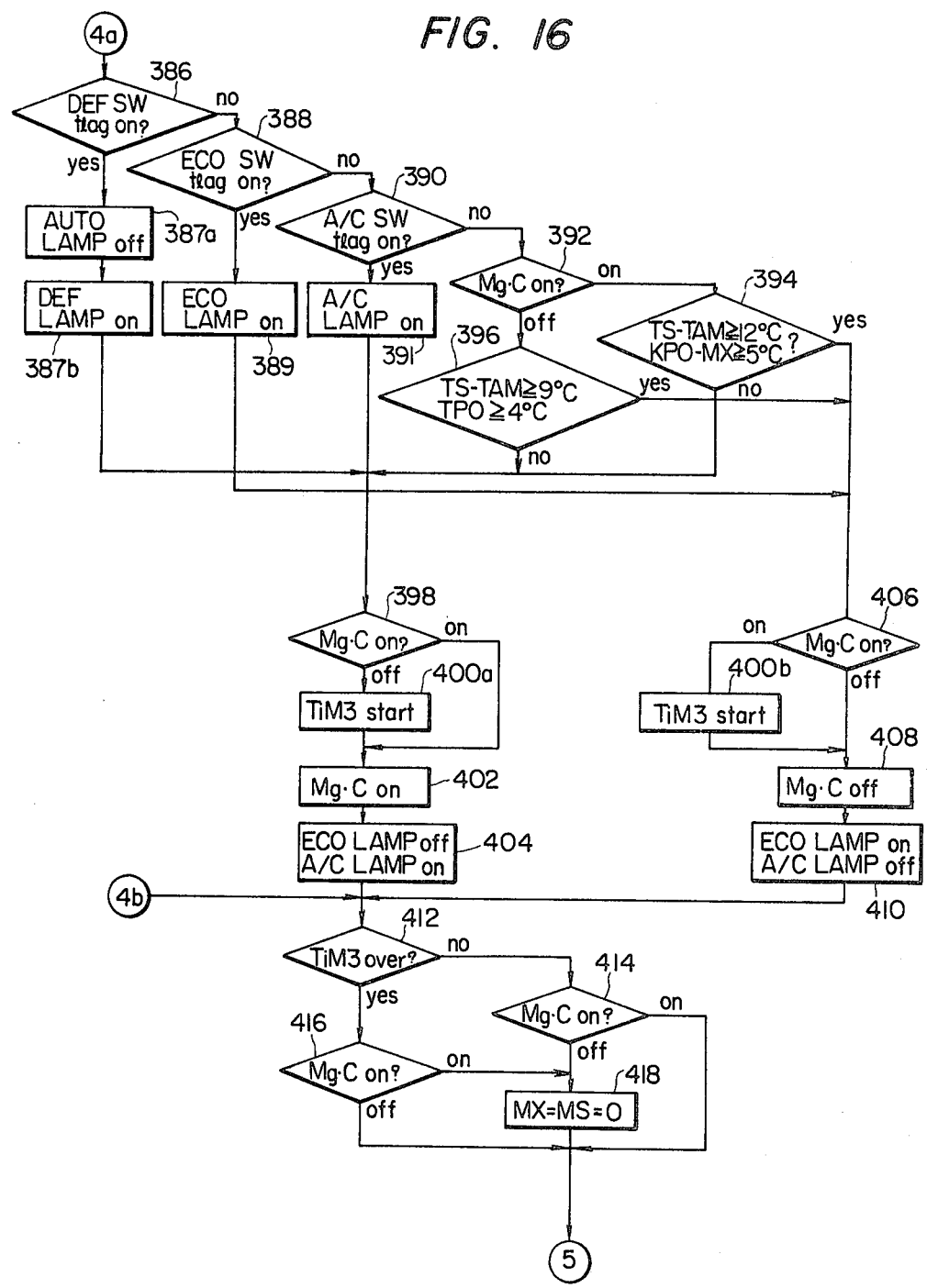
FIG. 16 is a flow diagram of a compressor control routine of the control program.

The detail of the compressor operating routine E is shown in FIG. 16.

(a) At steps 386 to 391 the computer checks the switch flags including defroster, ECONO and A/C to see if each flag has been set to turn on the associated lamps at steps 387b, 389 and 391.

(b) If ECONO and A/C switches both remain inoperative, the computer executes a step 394 or a step 396 depending on the ON-OFF states of the magnetic clutch 64 (which is checked at step 392 to determine which one of the decision routes to steps 402 and 408 is to be taken) by checking the deviation of the ambient temperature from the room temperature against specified reference values and checking the air mixing damper position data TPO and its corrected value KPO-MX respectively against specified angle values. At steps 402 and 408 decisions are respectively made to turn on or turn off the magnetic clutch 64 and to turn on or off the mode indicator lamps 88a and 89a.

(c) At steps 400a, 400b and 412 the computer executes timing operations to count a specified period (several tens of seconds) to allow determination of whether the correction data MX are to be set equal to "0" or not at step 418 after the elapse of that period.

Figure 17:
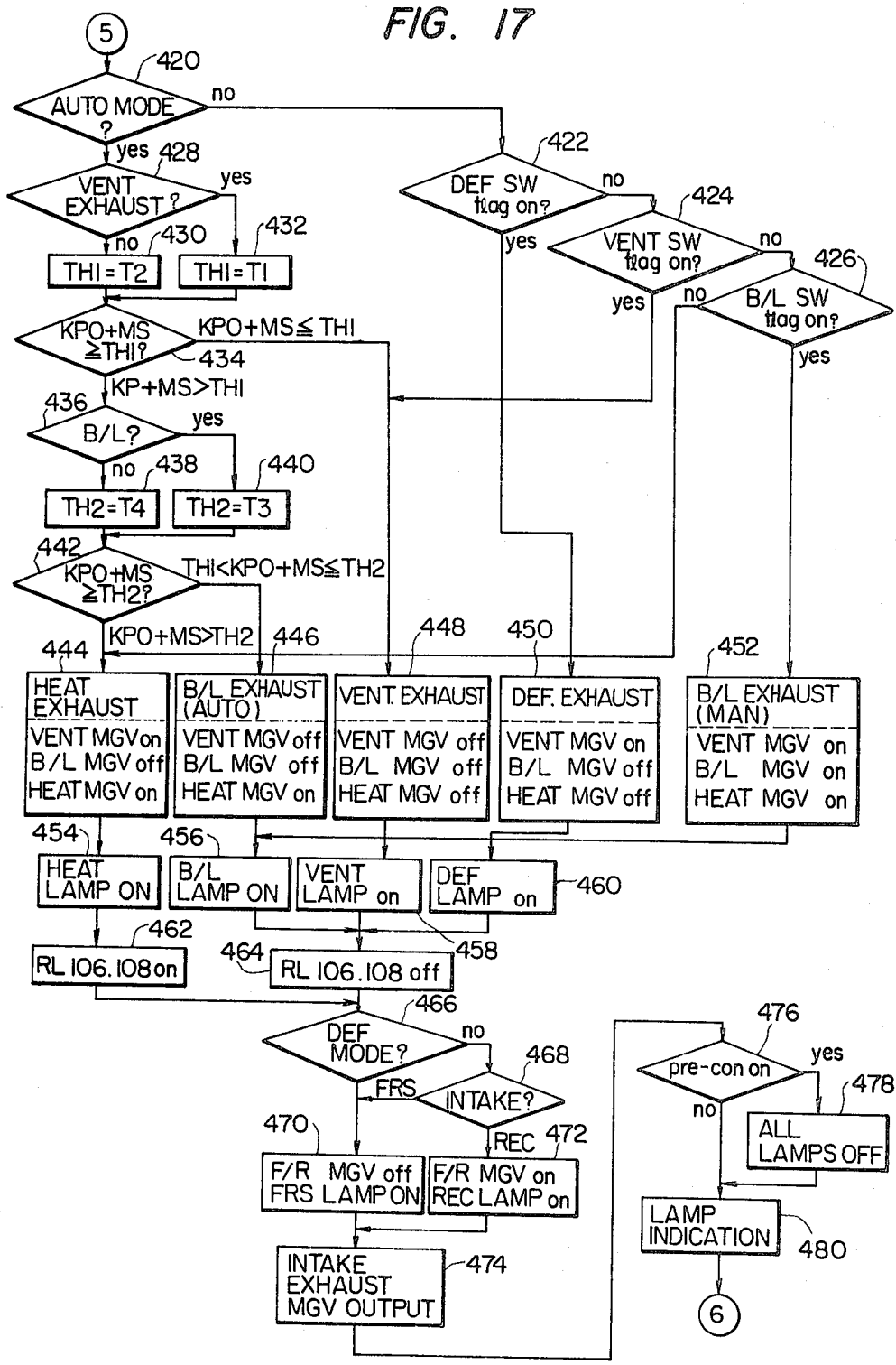
FIG. 17 is a flow diagram illustrating exhaust mode control routine.
Figure 18:
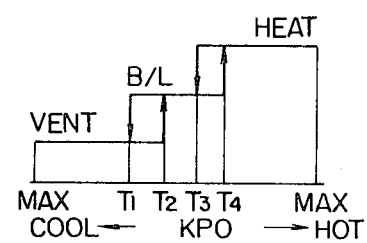
FIG. 18 is a graphic illustration of an operating characteristic associated with FIG. 17.

FIG. 17 is an illustration of the details of the exhaust mode control routine F, lamp indication routine H and temperature control routine I, in which the following operations are performed:

(a) Upon detection of an automatic mode (when defroster flag, vent flag, bi-level flag and heater flag are reset to "0" state) at step 420, steps 428 to 442 follow in succession to determine the rates of air streams to be discharged from the heater nozzle, bi-level nozzle and manifold (VENT) nozzles according to the air mixing data KPO, correction data MS and specified constants T1 to T4 as graphically shown in FIG. 18. These air flow rate determining steps are followed by steps 444, 446 and 448 in which the decisions made at steps 428 through 442 are executed at steps 444, 446 and 448 to determine the ON-OFF states of solenoid valves 62a, 62b and 62g according to specified rules.

(b) If one of switch flags associated with the manifold vent exhaust mode is in logical "1" state, the step 420 will be followed by steps 422 to 426 to determine which one of the switch flags is in logical "1" to execute steps 444, 448, 450 and 452 to determine the ON-OFF states of solenoid valves 62a, 62b and 62g according to specified rules.

(c) Mode indicator lamps 91a to 94a are lit at steps 454 to 460.

(d) If heater exhaust mode is selected, the warmup relays 106 and 108 are supplied with a voltage from drive circuit 107 to enable the coolant temperature sensor switches 110 and 112 to control these relays according to the sensed engine coolant temperature as previously described.

(e) At step 466 the ON-OFF state of the defroster switch flag is checked and at steps 468 intake air flags indicating the ON-OFF state of the inside air intake switch (REC), outside air intake switch (FRS) and the ON-OFF state of the forced inside air flag (see FIG. 13) are checked to execute steps 470 and 472 to determine the ON-OFF states of solenoid valve 62e associated with the intake air switching damper 26 and the ON-OFF states of mode indicator lamps 86a and 87a.

(f) At step 474 ON-OFF control signals are delivered to solenoid valves 62a to 62e and 62g through respective drive circuits 62a' to 62g' according to the decisions made in the preceding steps.

(g) At step 476 the presence of pre-control command is determined according to the ON-OFF state of blower switch 80 and if the latter is in OFF state (while ignition switch is ON) it is determined that all the mode indicator lamps 86a to 94a are to be extinguished.

(h) At step 480 lamp control signals are delivered in serial fashion to shift register 160 and a latch signal to latch 152 according to the decisions made in the preceding steps to control the mode indicator lamps 85a to 94a.

Figure 19:
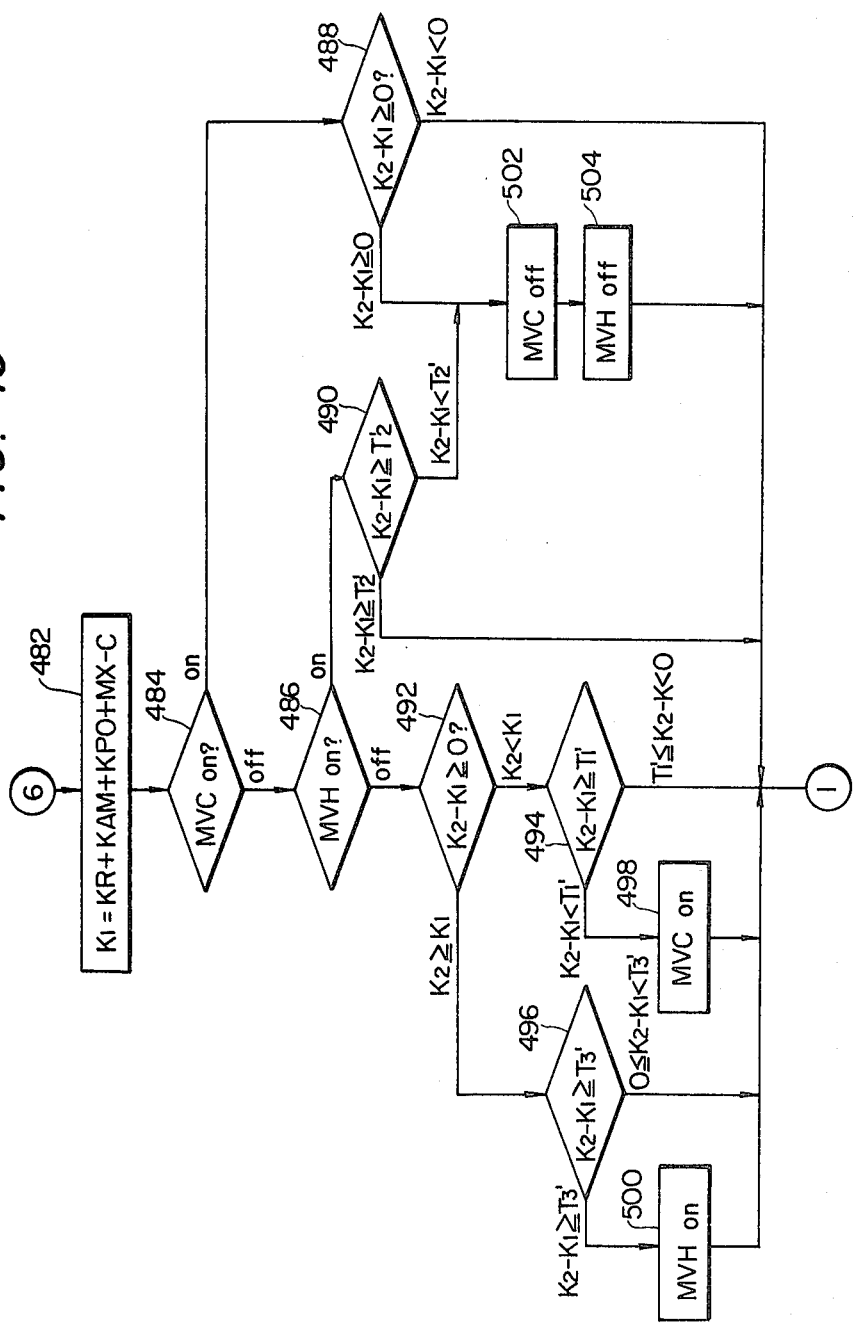
FIG. 19 is a flow diagram illustrating a room temperature control routine.

FIG. 19 is an illustration of the detail of the room temperature control routine I.

Figure 20:
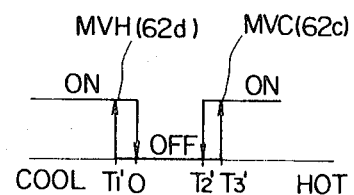
FIG. 20 is a graphic illustration of an operating characteristic associated with FIG. 19.

(a) This routine is executed in accordance with the program shown and described in Japanese Patent Application No. 55-47914 (the publication number of Japanese patent application No. 53-121855, which corresponds to U.S. application Ser. No. 199,920 filed Oct. 23, 1980, now U.S. Pat. No. 4,316,251) to determine the ON-OFF states of solenoid valves 62c and 62d to control the vehicle room temperature as illustrated in FIG. 20.

(b) Correction data MX, Msun and MAM are employed in the room temperature control routine.

Summarizing the operation of the present invention, the important items of display and control information are permanently stored in the display computer 134 which is powered directly from the vehicle-mounted storage battery, while the main computer 132, which is turned off from the power source when the vehicle engine is not operating, is put in readiness to receive the control data from the display computer 134 at the instant the ignition key switch is turned on. The separation of the computing functions between the two computers and their connection to the power source thus result in an increase in total memory capacity for providing diversified air conditioner control functions while keeping the total cost and power consumption to a minimum. The various functions provided by the control system of the present invention include:

(a) Automatic mode indication with which the instantaneous operating modes of the air conditioner are put on visual display as its intake and exhaust nozzles and compressor are automatically controlled in response to the sensed and reference temperatures. The automatic mode is switched to a desired manual control mode on the manual command unit with attendant changes in visual indication (see FIG. 16, steps 386 to 410, FIG. 17, steps 420 to 472). Manual mode is likewise switched to the automatic control mode with attendant changes in visual indication (FIG. 14, steps 350 to 378, FIG. 16, steps 386 to 391).

(b) Manual defrost mode in which outside fresh air is taken and the compressor is energized at full power to blast conditioned air through nozzle 18 to the windshield to produce a dehumidifying effect on water vapor condensed on the windshield to assure good visibility, with attendant visual indications of the operated elements. During this mode the inside air recirculating switch and compressor turn-off switch are disabled (see FIG. 14, steps 354 to 361, 368 to 372, FIG. 16, steps 386 to 404, FIG. 17, steps 446 to 470).

(c) Manual recirculating mode in which the operational mode is switched to inside air recirculation and the air cooling compressor is automatically energized to decrease the room temperature to dehumidify the water vapor which might condense on the windows due to recirculation. The operation of the compressor is also visually given. The compressor is turned off under certain conditions after the mode is switched to fresh air intake mode (see FIGS. 14, steps 370 to 376, FIG. 16, steps 388 to 410).

(d) Continuous temperature resetting is made possible by continuously depressing either one of the temperature resetting command switches provided on either front or rear seat until a desired reference temperature is reached. A single control program is available by either front or rear seat manual data entry or command unit.

(e) When the blower switch remains turned off, the operation of the fresh air intake switch and a desired exhaust mode selector switch causes the computer unit to control appropriate dampers to admit fresh air through the air conditioner main duct 10 to the vehicle compartment. The display signal is disabled and the compressor de-energized (see FIG. 7, steps 320 to 332, FIG. 17, steps 476 to 480).

(e) An optimum exhaust mode is determined according to sensed angular position of the air mixing damper as an excellent indication of exhaust air temperature to thereby eliminate the need of installing a temperature sensor or sensors adjacent to the exhaust nozzles. When the compressor is turned off, the sensed angular position is corrected as a function of sensed outside air temperature (FIG. 10, step 318, FIG. 16, step 418, FIG. 17, steps 428 to 442).

The embodiments shown and described above are only preferred embodiments. Various modifications of the invention will be apparent to those skilled in the art without departing from the scope of invention which is only limited by the appended claims.

What is claimed is:

1. A system for controlling an air conditioner mounted in an engine-powered roadway vehicle, comprising means for setting a reference temperature, a first digital computer having a memory directly coupled to a storage battery mounted in said vehicle and a processor for generating reference temperature data for said air conditioner in response to said reference temperature and storing the data in said memory during and after the operation of the vehicle engine, one or more sensors for generating auxiliary data representing the operating conditions of said air conditioner, and a second digital computer having a processor powered by said storage battery via an engine operating key switch and coupled to be responsive to said auxiliary data from said sensors and to said stored reference temperature data from said memory for controlling said air conditioner in accordance with said reference temperature data and said auxiliary data immediately following the operation of said key switch.

2. A system for controlling an air conditioner mounted in a roadway vehicle comprising:
input means for entry of manual command signals for resetting a reference temperature;
display means for displaying visual indications;
a first digital computer constantly powered by a storage battery mounted in the vehicle and coupled to be responsive to said command signals for generating display data representing said reference temperature and applying the display data to said display means to generate said visual indications and generating temperature control data;
a plurality of sensors for respectively detecting operating parameters of said air conditioner; and
a second digital computer powered by said storage battery through an ignition key switch of an engine of said vehicle and coupled to be responsive to said temperature control data from said first computer and said operating parameters detected by said sensors for controlling said air conditioner so that the temperature inside the vehicle varies in a direction toward said reference temperature.

3. A system as claimed in claim 2, wherein said air conditioner comprises a first intake passage for taking outside fresh air, a second intake passage for taking inside air, a blower fan for forcing the taken air in a downstream direction, an air heating unit and an air cooling unit adapted to be driven by a vehicle engine for heating and cooling air introduced through one of said intake passages, a plurality of exhaust nozzles located at different positions and a plurality of dampers for selectively directing the heated and cooled air to one or more of said exhaust nozzles, and wherein said input means includes a plurality of mode selector switches for entering mode selecting command signals to said second computer, said second computer including means for controlling said dampers according to said mode selecting command signals.

4. A system as claimed in claim 3, further comprising means for visually displaying the operating conditions of said dampers on said display means.

5. A system as claimed in claim 3, wherein said input means and said display means are mounted in a common housing as a manual command unit.

6. A system as claimed in claim 5, wherein said manual command unit is located at the front seat of the vehicle, and an additional manual command unit is located at the rear seat of the vehicle.

7. A system as claimed in claim 3, wherein said mode selector switches include an automatic mode selector switch for enabling said second computer to operate in response to said temperature control data and to said detected operating parameters to automatically reduce the difference between said reference and inside temperatures substantially to zero, and manual mode selector switches for interrupting said automatic mode and operating a predetermined one or more of said dampers.

8. A system as claimed in claim 7, further comprising means for visually indicating the instantaneous conditions of said dampers during the automatic mode and the operating condition of the predetermined one or more dampers during the manual mode.

9. A system as claimed in claim 7 or 8, wherein said manual mode selector switches include a defrost mode switch, and wherein said second computer is responsive to said defrost mode switch to operate one or more of said dampers so that an air flow is directed to a windshield of the vehicle.

10. A system as claimed in claim 9, wherein said second computer includes means responsive to said defrost mode switch for causing one of said dampers to move in a direction toward introducing fresh air through said first intake passage and causing said engine driven cooling unit to operate at full power.

11. A system as claimed in claim 7, wherein said manual mode selector switches include an air recirculating mode switch, and wherein said second computer is responsive to said recirculating mode switch to operate said engine driven cooling unit and operate one or more of said dampers to recirculate the cooled air inside the vehicle through said second intake passage.

12. A system as claimed in claim 11, further comprising means for disabling said air recirculating mode switch when the cooled air is being directed to said windshield.

13. A system as claimed in claim 2, wherein said input means includes a first temperature resetting command switch for generating a first command signal for increasing the reference temperature and a second temperature resetting command switch for generating a second command signal for decreasing said reference temperature, and wherein said first computer includes means for detecting when the period of operation of each one of said first and second temperature resetting command switches exceeds a predetermined value, and means for generating successively varying temperature control data for varying said reference temperature by a predetermined amount in a direction depending on the operated command switch in response to said period detecting means.

14. A system as claimed in claim 13, further comprising means for generating an audible indication in response to said period exceeding said predetermined value.

15. A system as claimed in claim 13, wherein said first and second command switches are located in the front seat of the vehicle, further comprising third and fourth temperature resetting command switches identical to said first and second temperature resetting command switches respectively and located in the rear seat of the vehicle, said first and third temperature resetting command switches being connected in parallel with each other and said second and fourth temperature resetting command switches being connected in parallel with each other.

16. A system as claimed in claim 3 or 11, wherein one of said dampers is pivotally mounted adjacent to said air heating and cooling units for mixing the heated and cooled air in a ratio according to an output signal from said second computer for controlling the temperature inside the vehicle, further comprising means for controlling the rotational speed of said blower fan as a function of the angular position of said air mixing damper.

17. A system as claimed in claim 16, wherein said input means further includes a blower fan automatic mode command switch for effecting said speed control operation and blower fan manual mode command switches for disabling said automatic speed control mode and enabling said blower fan to run at one of specified speeds.

18. A system as claimed in claim 16, further comprising means for sensing the coolant temperature of the vehicle engine for switching the operational mode of said blower fan from the automatic speed control mode to a said manually controlled speed mode when the coolant temperature is below a predetermined level.

19. A system as claimed in claim 16, wherein said input means further includes a blower fan turn-off switch for de-energizing said blower fan and causing a said damper to introduce outside fresh air through said first intake passage and causing said second computer to control one or more of said dampers to direct the introduced outside air to one or more of said exhaust nozzles.

20. A system as claimed in claim 16, further comprising means for detecting when said angular position is equal to or greater than a predetermined value at which the air mixing damper is directing a cooled air flow to the exhaust nozzles, and means for switching a said damper from the recirculating mode to an outside air intake mode to allow introduction of outside air through said first intake passage in response to said angular position detecting means.

21. A system as claimed in claim 19, wherein said first computer includes means for entirely extinguishing said visual indications in response to the operation of said turn-off switch and causing said engine driven air cooling unit to be de-energized.

22. A system as claimed in claim 3, wherein one of said dampers is pivotally mounted adjacent to said air heating and cooling units for mixing the heated and cooled air, and wherein said second computer includes means for controlling the remainder of said dampers in one of specified operating modes according to the angular position of said air mixing damper.

23. A system as claimed in claim 22, wherein said second computer further includes means coupled to said air mixing damper for detecting the angular position thereof, means for correcting said detected angular position as a function of a said sensed operating parameter indicating the temperature outside of the vehicle when said engine driven cooling unit remains de-energized, and means for controlling said remainder of said dampers in response to said corrected angular position of said air mixing damper.

* * * * *